(12) United States Patent
Kobayashi

(10) Patent No.: US 8,068,165 B2
(45) Date of Patent: Nov. 29, 2011

(54) IMAGING APPARATUS

(75) Inventor: Miki Kobayashi, Tokyo (JP)

(73) Assignee: Olympus Corporation, Tokyo (JP)

(*) Notice: Subject to any disclaimer, the term of this patent is extended or adjusted under 35 U.S.C. 154(b) by 520 days.

(21) Appl. No.: 12/299,711

(22) PCT Filed: May 15, 2007

(86) PCT No.: PCT/JP2007/060310
§ 371 (c)(1),
(2), (4) Date: Nov. 5, 2008

(87) PCT Pub. No.: WO2008/026353
PCT Pub. Date: Mar. 6, 2008

(65) Prior Publication Data
US 2009/0135290 A1      May 28, 2009

(30) Foreign Application Priority Data

Aug. 29, 2006  (JP) ................................ 2006-231968

(51) Int. Cl.
G03B 13/00 (2006.01)
G02B 27/00 (2006.01)

(52) U.S. Cl. ........................................ 348/345; 359/601

(58) Field of Classification Search ................. 348/345; 359/601
See application file for complete search history.

(56) References Cited

U.S. PATENT DOCUMENTS

| | | | | |
|---|---|---|---|---|
| 5,589,983 A * | 12/1996 | Meyers et al. | ................. | 359/566 |
| 6,555,029 B1 * | 4/2003 | Ruscio et al. | ................. | 264/1.1 |
| 6,650,477 B2 * | 11/2003 | Nakai | ........................... | 359/569 |
| 7,256,947 B2 * | 8/2007 | Nishimura | ..................... | 359/722 |
| 7,471,457 B2 * | 12/2008 | Takahashi | ..................... | 359/642 |
| 2005/0036215 A1 * | 2/2005 | Nishimura | ..................... | 359/738 |
| 2005/0202754 A1 * | 9/2005 | Bechtold et al. | ................... | 451/5 |
| 2007/0170557 A1 * | 7/2007 | Shimizu | ........................ | 257/668 |

FOREIGN PATENT DOCUMENTS

| | | |
|---|---|---|
| JP | 62-196613 A | 8/1987 |
| JP | 7-128501 A | 5/1995 |
| JP | 2005-331715 A | 12/2005 |

OTHER PUBLICATIONS

International Search Report of PCT/JP2007/060310, Mailing Date of Aug. 21, 2007.

* cited by examiner

Primary Examiner — Rodney Fuller
(74) Attorney, Agent, or Firm — Westerman, Hattori, Daniels & Adrian, LLP

(57) ABSTRACT

An imaging apparatus where images of good quality can be obtained without being affected by the diffraction phenomenon and without recourse to any polishing. The imaging apparatus is adapted to form a subject image on an imaging plane having light receptor elements arranged on it via an imaging optical system. The imaging optical system has a molded optical element fabricated through a fabrication process in which a periodic streak is produced on an optical surface. When a high-brightness subject light whose brightness value exceeds the saturation sensitivity of each light receptor element enters the imaging optical system, a nonessential light image resulting from the streak on the optical surface based on the high-brightness subject light is formed on the imaging plane and in an area of a subject image from the high-brightness subject light at the time when the optical plane is supposed to be free of the streak.

12 Claims, 18 Drawing Sheets

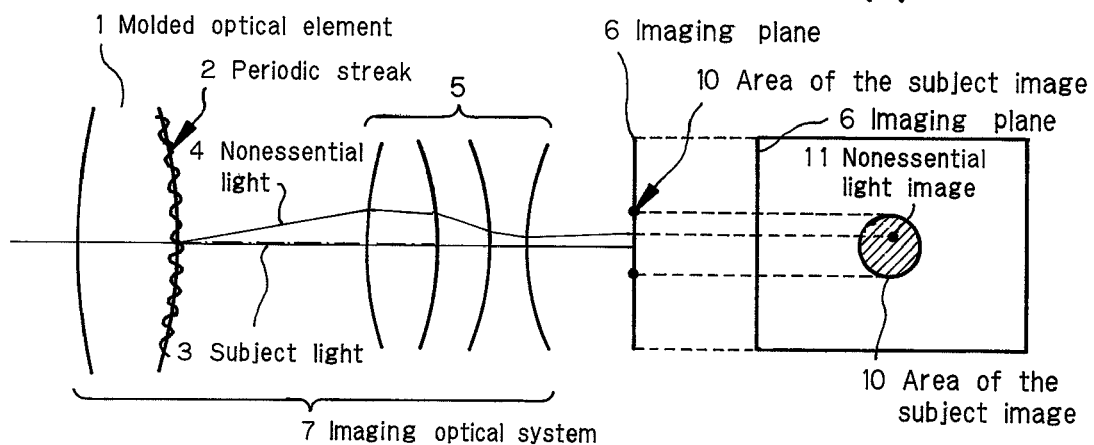
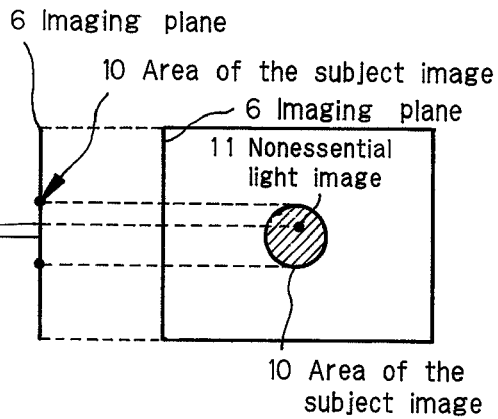
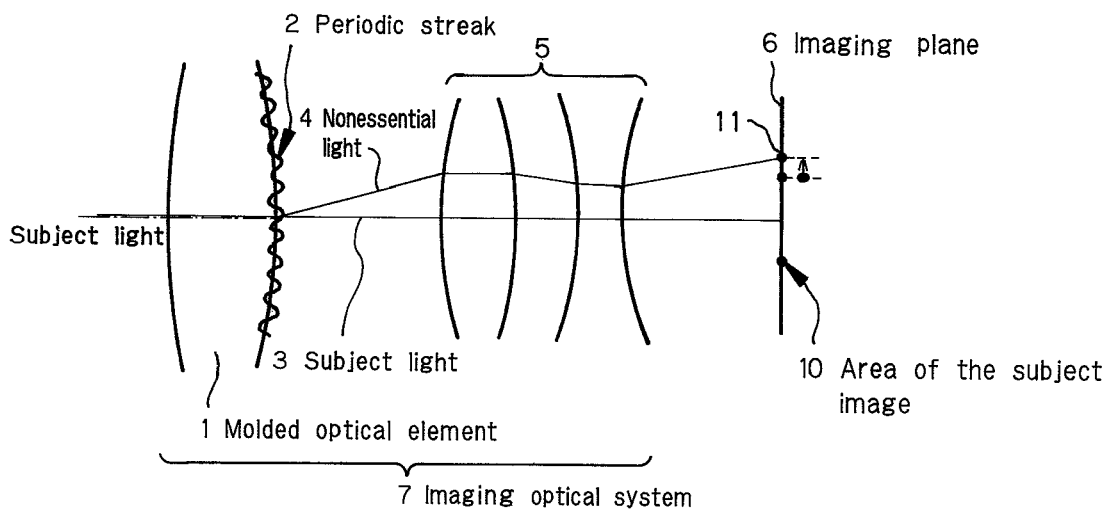
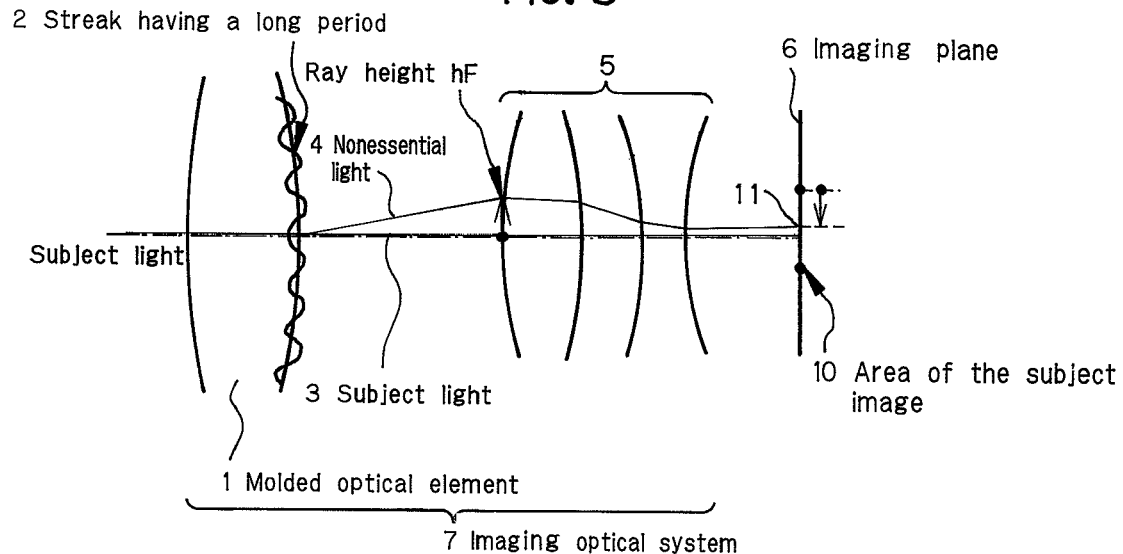

IMAGING APPARATUS

ART FIELD

The present invention relates generally to imaging apparatus, and more particularly to imaging apparatus with molded optical elements included in an imaging optical system, for instance, silver-halide cameras, digital cameras, endoscopes, and microscopes.

BACKGROUND ART

FIG. 20 is illustrative in section and schematic of one example of prior art imaging optical systems. The imaging optical system comprises, in order from its object side (the left side of FIG. 20), a first lens group G1 having a positive focal length and a second lens group G2 having a negative focal length with a stop S interposed between them. The first lens group G1 comprises, in order from its object side, a positive first lens L1, a negative second lens group L2, and a positive third lens L3 and a fourth lens L4 having a cementing surface, and the second lens group G2 comprises a fifth lens L5 defined by a positive meniscus lens convex on an imaging plane side and a sixth lens L6 defined by a negative meniscus lens concave on the object side. Light emanating out of a subject passes through the first lens L1 to the sixth lens L6, and is imaged on an imaging plane 6 with a CCD image sensor placed on it, where the image of the subject is taken.

Well now, current trends in recent imaging optical systems are to reduce their size, weight and cost, and with this, molded optical elements more improved in terms of mass productivity and cost than ordinary polished optical elements are more frequently used for optical elements used with them, too. Molded optical elements are preferably fabricated by molding glasses or resins using molds.

In cutting of the mold used for such molding, there is the need of simplifying the process involved and keeping processing precision high; to this end, cutting is generally implemented by operating a cutting tool at equal pitch in a certain direction or operating a cutting tool at equal speed on a constantly rotating mold member.

However, when the mold is prepared by operating a cutting tool at equal pitch in a certain direction or operating a cutting tool at equal speed on a constantly rotating mold member, there is a minute, periodic streak produced depending on the feed pitch or the rotation speed and feed speed.

As the mold having such a streak is used for glass or resin molding, it is transferred, yielding a molded optical element having a periodic streak, too.

As high-brightness subject light inclusive of sunlight, light from light sources, illumination light and light from emitters is taken with a digital camera's imaging apparatus comprising a molded optical element having such a streak, there is diffracted light generated from that streak on the surface of the molded optical element. As shown in FIG. 22, this diffracted light is concurrently incident on a position different from the position with a light source image 10 formed at it, forming a nonessential light image 11. Note here that the optical system of FIG. 20 is used as the imaging optical system 7 of FIG. 22, and the $7^{th}$ optical surface (the surface of the $4^{th}$ lens L4 on the imaging plane side) $r_7$ is supposed to have a periodic streak 2.

A problem with the periodic streak 2 thus produced on the molded optical element surface is that, as shown in FIG. 22, nonessential light occurs, giving rise to image quality deterioration.

To reduce or eliminate such a nonessential light image, the method for removing that streak by a polishing step has been used so far in the art. With that method, however, there is a risk of design surface shape breaking down, resulting in a lowering of resolving power.

It is noted that when the optical element having such a periodic streak is used with an image reader using a line sensor and a rectangular optical element, it has been proposed in Patent Publication 1 to get rid of influences of diffracted light from that steak. However, this is not applicable to an image apparatus using two-dimensional light receptor elements as herein contemplated.

[Patent Publication 1]
JP(A)2005-331715

DISCLOSURE OF THE INVENTION

Having been made to solve such problems, the invention has for its object the provision of an imaging apparatus that enables good image quality to be obtained without being affected by a diffraction phenomenon, even when a molded optical element is not subjected to polishing and so has a periodic streak.

According to the first aspect of the invention, there is an imaging apparatus provided in which a subject image is formed by an imaging optical system on an imaging plane wherein a plurality of pixels are two-dimensionally arranged, and a light receptor element for photoelectric transformation at each pixel is positioned, characterized in that:

said imaging optical system comprises a molded optical element fabricated through a fabrication process in which a periodic streak is produced on an optical surface, wherein:

when high-brightness subject light whose brightness value exceeds the saturation sensitivity of said light receptor element enters said imaging optical system, a nonessential light image resulting from said streak on said optical surface based on said high-brightness subject light is formed on said imaging plane and in an area of a subject image from said high-brightness subject light at the time when said optical plane is supposed to be free of said streak.

Preferably in this case, based on at least one of optical parameters for determining the collecting/diverging performance of an optical system included between the optical surface having said streak and said imaging plane or the period of said streak, said nonessential light image is formed in the area of the subject image from said high-brightness subject light at the time when said optical surface is supposed to be free of said streak.

FIG. 1 is generally illustrative of how the subject image and the nonessential light image are formed with the inventive imaging apparatus: FIG. 1($a$) is a sectional view as taken along an optical axis and FIG. 1($b$) is illustrative of where there are those images formed on the imaging plane. An imaging optical system 7 comprises a molded optical element 1 with a periodic streak 2 formed on an optical surface, and an optical system 5 included between the optical surface having that periodic streak 2 and an imaging plane 6, wherein the periodic streak 2 has resulted from the molding process for forming the molded optical element 1.

Referring to such an imaging apparatus, reference numeral 11 stands for a nonessential light image based on nonessential light (diffracted light) 4 from the periodic streak 2 when high-brightness subject light whose brightness value exceeds the saturation sensitivity of the light receptor elements located on the imaging plane 6 enters the imaging optical system 7, and reference numeral 10 stands for an area of the subject image formed from subject light 3 at the time when such high-brightness subject light enters the optical surface of the molded optical element 1 free of the periodic streak 2. As shown in FIG. 1, various parameters for the imaging apparatus are determined such that the nonessential light image 11 is formed in the area 10 of the subject image on the imaging plane 6.

When there is none of the parameters determined as mentioned above, the nonessential light image 11 is formed at a position different from the area 10 of the subject image within the imaging plane 6: it remains noticeable, as shown in FIG. 2.

Here, the longer the period d of the periodic streak 2, the smaller the angle of diffraction becomes and the lower the ray height hF of the nonessential light 4 goes on the first surface of the optical system 5, as shown in FIG. 3. In other words, the nonessential light image 11 is formed near the area 10 of the subject image: it remains less noticeable.

Further, the nonessential light image 11 on the imaging plane 6 can be formed within the area 10 of the subject image based on the optical parameters that define the collecting/diverging performance of the optical system 5 included between the optical surface having the periodic streak 2 and the imaging plane 6.

As shown in FIG. 4, when the optical system 5 included between the optical surface having the streak 2 and the imaging plane 6 has convex power, the greater the curvature R of that positive power surface, the more largely light rays are refracted; so the nonessential light image 11 is formed, and remains less noticeable, near the area 10 of the subject image within the imaging plane 6.

Also, as shown in FIG. 5, the shorter the distance SF from the optical surface having the streak 2 to the subsequent first surface of the optical system 5, the lower the ray height hF of the nonessential light goes on the first surface of the optical surface 5; so the nonessential light image 11 is formed, and remains less noticeable, near the area 10 of the subject image.

As exemplified in FIGS. 4 and 5, based on the optical parameters that define the collecting/diverging performance of the optical system 5 included between the optical system having the streak 2 and the imaging plane 6, the nonessential light image 11 on the imaging plane 6 can be formed, and remain less noticeable, within the area 10 of the subject image.

The optical parameters that define the collecting/diverging performance of the optical system 5 included between the optical surface having the streak 2 and the imaging plane 6, for instance, include the curvature and material (refractive index) of each optical surface, and the surface-to-surface spacing.

As described above, even when there is the periodic streak 2 produced on the optical surface, the nonessential light can be made less noticeable without recourse to any polishing.

In the invention as described above, the non-essential light image should preferably be formed in such a way at to satisfy the relation: P>Δt where Δt is a distance between the light intensity peak position of the subject image and the light intensity peak position of the nonessential light image, and P is a distance between the light intensity peak position of the subject image and the boundary of the area where the intensity of the subject image exceeds the saturation sensitivity of the light receptor element.

As can be seen from the distance Δt vs. P relations shown in FIG. 6, if the distance Δt between the light intensity peak position of the subject image and the light intensity peak position of the nonessential light image is shorter than the distance P between the light intensity peak position of the subject image and the boundary of the area where the intensity of the subject image exceeds the saturation sensitivity of the light receptor element, then the nonessential light image 11 is formed within the area 10 of the subject image on the imaging plane 6.

It is thus possible to make the nonessential light less noticeable without recourse to any polishing, even when there is the periodic streak 2 produced on the optical surface of the molded optical element 1.

In the invention as described above, the nonessential light image should preferably be formed in such a way as to satisfy the relation: I1>I2 where I1 stands for the light intensity of the subject image at the light intensity peak position of the nonessential light image, and I2 stands for the light intensity of the nonessential light image.

As can be seen from the distance I1 vs. I2 relations shown in FIG. 7, if the distance Δt between the light intensity peak position of the subject image and the light intensity peak position of the nonessential light image is shorter than a distance K between the light intensity peak position of the subject image and the light intensity peak position of the subject image at which I1=I2, that is, if I1>I2, it is then possible to form the nonessential image light 11 within the area 10 of the subject image on the imaging plane 6.

The arrangement being like this, even when there is a strong intensity of the nonessential light with the periodic streak 2 produced on the optical surface, the nonessential light can be made less noticeable without recourse to any polishing.

In the invention as described above, the performance of the nonessential light image should preferably be determined for the longest wavelength arriving at the imaging plane via the imaging optical system.

As shown in FIG. 8, the position of formation of the nonessential light image on the imaging plane 6 varies for each wavelength: the longer (red) the wavelength, the more far the nonessential light image becomes away from the subject image. If the nonessential light of the longest wavelength arriving at the imaging plane via the imaging optical system is imaged within the area 10 of the subject image on the imaging plane 6, then it means that all the nonessential light having shorter wavelengths is imaged within the area 10 of the subject image.

The arrangement being like this, even when there is the periodic streak 2 produced on the optical surface, the nonessential light, including all the light having shorter wavelengths than the longest one and arriving at the imaging plane via the imaging optical system, can be made less noticeable without recourse to any polishing.

For the invention, it is desired to satisfy the following condition (1):

$$Q > \{f + (SB-fB)(SF-fF)/f\} \times \sin^{-1}(\lambda/nd) \qquad (1)$$

Here λ is the longest wavelength arriving at the imaging plane via the imaging optical system, Q is the maximum radius of the aforesaid area of the subject image, n is the refractive index on the image plane side of the streaked optical surface, d is the period of the periodic streak on the streaked optical surface, f is the focal length of the optical system included between the streaked optical surface and the imaging plane, fF is the front focus position, fB is the back focus position, SF is the spacing between the streaked optical surface and the next optical surface on the imaging plane side, and SB is the spacing between the final surface of the optical system included between the streaked optical surface and the imaging plane and the imaging plane.

The parameters Q, n, d, f, fF, fB, SF and SB as defined above are shown in FIG. 9. These parameters could be used to define the relations between the condition for forming the nonessential light 4 within the area 10 of the subject image on the imaging plane 6 and the parameters concerning the periodic streak 2 and the optical system 5 included between the optical surface having that streak 2 and the imaging plane 6 according to the aforesaid relation (1).

The maximum radius Q of the area of the subject image is determined depending on the condition for forming the nonessential light 4 within the area 10 of the subject image on the imaging plane 6; specifically, Q is equivalent to the aforesaid P, and K.

The arrangement being like such, it is possible to easily figure out the correction conditions for the optical system to make the nonessential light less noticeable depending on the size of the subject image as well as the period of the streak. It is also possible to obtain the conditions for optimizing optical parameters such as the curvature and material (refractive index) of each optical surface, and the surface-to-surface spacing for the purpose of making the nonessential light less noticeable in the case where correction of the streak period cannot be implemented by processing techniques.

According to the first aspect of the invention as described above, there can be an imaging apparatus provided that enables good enough image quality to be obtained without being affected by the diffraction phenomenon yet without recourse to any polishing, even when there is a periodic streak that should be polished off.

According to the second aspect of the invention, there is an imaging apparatus provided in which a subject image is formed by an imaging optical system on an imaging plane wherein a plurality of pixels are two-dimensionally arranged, and a light receptor element for photoelectric transformation at each pixel is positioned, characterized in that:

said imaging optical system comprises a molded optical element fabricated through a fabrication process in which a periodic streak is produced at an optical surface, wherein:

a nonessential light image from said streak on said optical surface based on high-brightness subject light whose brightness value exceeds the saturation sensitivity of said light receptor element is formed on said imaging plane and in a second imaging area different from a first imaging area where imaging information about the subject image is let in.

Preferably in this case, based on at least one of optical parameters for determining the collecting/diverging performance of an optical system included between the optical surface having said streak and said imaging plane or the period of said streak, said nonessential light image is formed in the second imaging area.

FIG. 10 is generally illustrative of how the subject image and the nonessential light image are formed with the inventive imaging apparatus: FIG. 1(a) is a sectional view as taken along an optical axis and FIG. 1(b) is illustrative of where there are those images on the imaging plane. An imaging optical system 7 comprises a molded optical element 1 with a periodic streak 2 formed on an optical surface, and an optical system 5 included between the optical surface having that periodic streak 2 and an imaging plane 6, wherein the periodic streak 2 has resulted from the molding process for forming the molded optical element 1.

Referring to such an imaging apparatus, reference numeral 21 stands for a nonessential light image based on nonessential light (diffracted light) 4 from the periodic streak 2 upon incidence of the subject light, and reference numeral 20 stands for an imaging area where imaging information about the subject is let in. As shown in FIG. 10, various parameters for the imaging apparatus are determined such that the nonessential light image 21 is formed in the area different from the imaging area 20 where the imaging information about the subject on the imaging plane 6 is let in.

When there is none of the parameters determined as mentioned above, the nonessential light image 21 is formed in the imaging area 20 wherein the imaging information about the subject is let in: it remains there, as shown in FIG. 11.

Here, the longer the period d of the periodic streak 2, the smaller the angle of diffraction becomes and the lower the ray height hF of the nonessential light 4 goes on the first surface of the optical system 5, as shown in FIG. 12. In other words, the nonessential light image 21 is formed away from the imaging area 20 where the imaging information about the subject is let in.

Further, such nonessential light image 21 as shown in FIG. 10 can be formed in the area different from the imaging information about the subject is let in, based on the optical parameter that defines the collecting/diverging performance of the optical system 5 included between the optical surface having the periodic streak 2 and the imaging plane 6.

As shown generally in FIG. 13, when the optical system 5 included between the optical surface having the streak 2 and the imaging plane 6 has convex power, the smaller the curvature R of that positive power surface, the more gently light rays are refracted; so the nonessential light image 11 is formed more away from the imaging area 20 where the imaging information about the subject is let in.

Also, as shown in FIG. 14, the longer the distance SF from the optical surface having the streak 2 to the subsequent first surface of the optical system 5, the higher the ray height hF of the nonessential light goes on the first surface of the optical surface 5; so the nonessential light image 11 is formed more away from the imaging area 20 where the imaging information about the subject is let in.

The optical parameters here for determining the collecting/diverging performance of the optical system 5 included between the optical surface having the streak 2 and the imaging plane 6, for instance, include the curvature and material (refractive index) of each optical surface and the surface-to-surface spacing.

In the invention as described above, even when there is the periodic streak 2 produced on the optical surface, the taken image can be rid of the nonessential light without recourse to any polishing.

Preferably, the nonessential light image from the light rays that are incident on the streaked optical surface at the largest angle of incidence is formed at a position that lies within the second imaging area and does not go beyond an optical axis.

The light rays that are incident on the streaked optical surface at the largest angle of incidence are determined by the diameters of optical elements in front of the streaked optical surface, an optical element holder, and a stop inserted in the optical system. As shown in FIG. 15, it is preferable that the nonessential light 4, resulting from the light rays that are incident on the optical surface having the streak 2 at the largest angle of incidence, is formed in an area different from the area 20, where the imaging information about the subject is let in, such that it does not go beyond an optical axis O-O' on the imaging plane 6.

When the nonessential light 4, resulting from the light rays that are incident on the optical surface having the streak 2 at the largest angle of incidence on the imaging plane 6, goes beyond the optical axis O-O', a portion of the nonessential light 4, resulting from light rays incident at smaller angles, may possibly enter the imaging area 20 where the imaging information about the subject is let in, as shown in FIG. 16.

Thus, by preventing the nonessential light 4 resulting from the light rays incident on the optical surface having the streak 2 at the largest angle of incidence from going beyond the optical axis O-O', even an imaging apparatus, wherein the imaging area 20 for letting in the imaging information about the subject is of large size, could be unlikely to produce unessential light in taken images without recourse to any polishing, even when there is the periodic streak 2 produced in the optical surface of the molded optical element 1.

Regarding the light rays incident on the streaked optical surface at the largest angle of incidence, it is preferable the performance of the aforesaid nonessential light image is determined for light rays that go beyond the designed largest angle of incidence.

As shown in FIG. 17, the light rays having the designed largest angle of incidence are defined as those arriving at the outermost periphery of the imaging area (the first imaging area) where the imaging information about the subject is let in. Preferably, a portion of the nonessential light 4, that goes beyond the designed largest angle of incidence and that results from light rays incident on the optical surface having the streak 2 at the largest angle of incidence (determined by the diameters of optical elements in front of the streaked optical surface, an optical element holder, and a stop inserted into the optical system), is formed in the area different from the imaging area 20, where the imaging information about the subject is let in, such that it does not go beyond the optical axis O-O' on the imaging plane 6.

The arrangement being like such, at whatever angle the subject light enters the imaging optical system 7, it is possible to prevent the nonessential light from being brought in taken images without recourse to any polishing, even when there is the periodic streak 2 produced on the optical surface.

Preferably in this case, the performance of the shortest wavelength arriving at the imaging plane via the imaging optical system with respect to the nonessential light image is determined.

As shown in FIG. 18, the position of the nonessential light image formed on the imaging plane 6 varies from wavelength to wavelength, and the shorter (blue) the wavelength, the closer the nonessential light image gets to the subject image. If the nonessential light of the shortest wavelength arriving at the imaging plane via the imaging optical system is formed in the area different from the imaging area 20 where the imaging information about the subject is let in, it then means that all nonessential light having other longer wavelengths, too, is imaged in the area different from the imaging area 20 where the imaging information about the subject is let in.

The arrangement being like such, subject light wavelengths longer than the shortest wavelength arriving at the imaging plane via the optical imaging optical system could be unlikely to bring nonessential light in taken images without recourse to any polishing, even when there is tire periodic streak 2 produced on the optical surface.

It is also desired to satisfy the following relation (2):

$$H < \{f + (SB - fB)(SF - fF)/f\} \times \sin^{-1}(\lambda/nd) \quad (2)$$

Here $\lambda$ is the shortest wavelength arriving at the imaging plane via the imaging optical system, H is the maximum length of the first imaging area, n is the refractive index on the image plane side of the streaked optical surface, d is the period of the periodic streak on the optical surface having the steak, f is the focal length of the optical system included between the streaked optical surface and the imaging plane, fF is the front focus position, fB is the back focus position, SF is the spacing between the streaked optical surface and the next optical surface on the imaging plane side, and SB is the spacing between the final surface of the optical system included between the streaked optical surface and the imaging plane and the imaging plane.

The parameters Q, n, d, f, fF, fB, SF and SB as defined above are shown in FIG. 19. These parameters could be used to define the relations between the maximum length H of the imaging area 20 and the parameters concerning the periodic streak 2 and the optical system 5 included between the optical surface having that streak 2 and the imaging plane 6 according to the aforesaid relation (2).

The arrangement being like such, it is possible to easily figure out the correction conditions for the optical system not to bring nonessential light in taken images. It is also possible to obtain the conditions for optimizing optical parameters such as the curvature and material (refractive index) of each optical surface, and the surface-to-surface spacing for the purpose of bringing in no nonessential light in the case where correction of the streak period cannot be implemented by processing techniques.

BRIEF DESCRIPTION OF THE DRAWINGS

FIG. 1 is illustrative of how the subject image and the nonessential light image are formed with the imaging apparatus according to the first aspect of the invention.

FIG. 2 is illustrative of how noticeable the non-essential light image is when there is none of the parameters determined with the imaging apparatus according to the first aspect of the invention.

FIG. 3 illustrates that the longer the period of the periodic streak, the lesser noticeable the nonessential light image becomes.

BEST MODE FOR CARRYING OUT THE INVENTION

Figure 20:
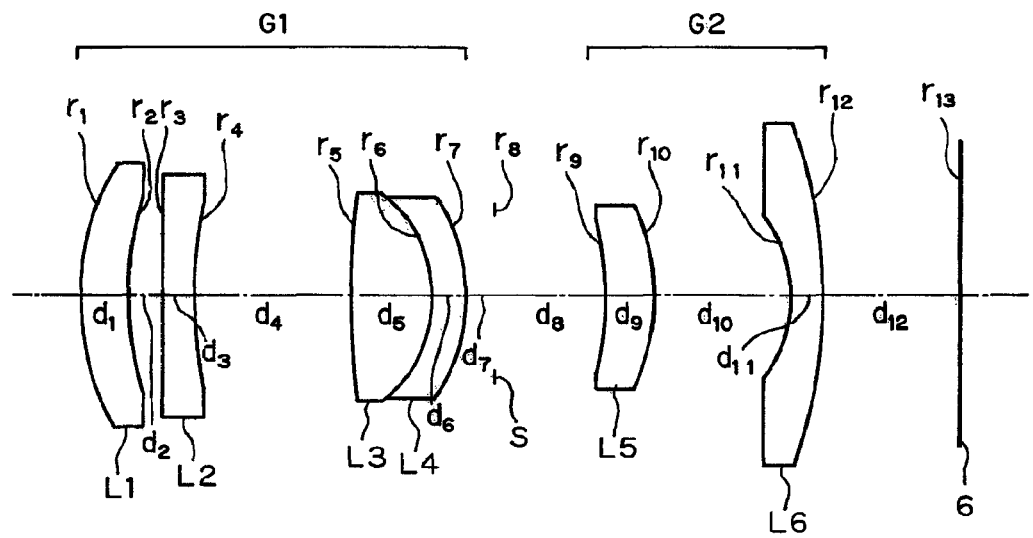
FIG. 20 is illustrative in section and schematic of the imaging optical systems used in Examples 1 and 2.

FIG. 20 is illustrative in section and schematic of one example of the imaging optical system, of the prior art.

What is illustrated in FIG. 20 is an imaging optical system having an F-number of 5.8 and a focal length of 50 mm, and consisting of, in order from its object side, a first lens group G1 having a positive focal length and a second lens group G2 having a negative focal length with a stop S interposed between them. In order from the object side, the first lens group G1 is made up of a positive first lens L1 and a negative second lens L2, and a positive third lens L3 and a fourth lens L4 having a cementing surface, and the second lens group G2 is made up of a fifth lens L5 defined by a positive meniscus lens convex on an imaging plane side and a sixth lens L6 defined by a negative meniscus lens concave on the object side.

There will be numerical data on this imaging optical system shown in Table 1 given later, wherein $r_1, r_2$ . . . are indicative of the radius of curvature of each lens surface (and also indicative of the first surface, the second surface, etc.); $d_1, d_2$ . . . are indicative of the surface-to-surface spacing of each lens; $n_{d1}, n_{d2}$ . . . are indicative of the d-line refractive index of each lens; and $V_{d1}, V_{d2}$ . . . are indicative of the Abbe constant of each lens. Note here that aspheric shape is given by the following equation (3) wherein x is an optical axis provided that the direction of propagation of light is positive, and y is a direction orthogonal to the optical axis.

$$x=(y^2/r)/[1+\{1-(y/r)^2\}^{1/2}]+A_4y^4+A_6y^6+A_8y^8 \quad (3)$$

Here r is a paraxial radius of curvature, and $A_4$, $A_6$ and $A_8$ are the fourth-order, sixth-order and eighth-order aspheric coefficients, respectively. Throughout the disclosure, $r_0$ is supposed to be the radius of curvature of the object plane, and $d_0$ is supposed to be the spacing from the object plane to the first surface.

It is here noted that the $4^{th}$ $r_4$ and $9^{th}$ $r_9$ surfaces of this imaging optical system are aspheric.

Light emanating from the subject transmits through the optical surfaces $r_1$ to $r_{12}$ in FIG. 20, and is imaged on an imaging plane (the $13^{th}$ surface $r_{13}$) having a CCD image sensor placed on it, which has a diagonal length of 11.15 mm and a pixel pitch of 0.0053 mm, thereby taking a subject image.

Of the lenses forming a part of the imaging optical system of FIG. 20, the third lens L3, and the fourth lens L4 is a molded optical element whose optical surfaces may possibly have a periodic streak, because of having been fabricated through a fabrication process likely to give rise to such a periodic streak. Upon incidence on the optical surface having that periodic streak of sunlight or light from a high-brightness illuminator instrument, there is diffracted light produced.

Figure 21:
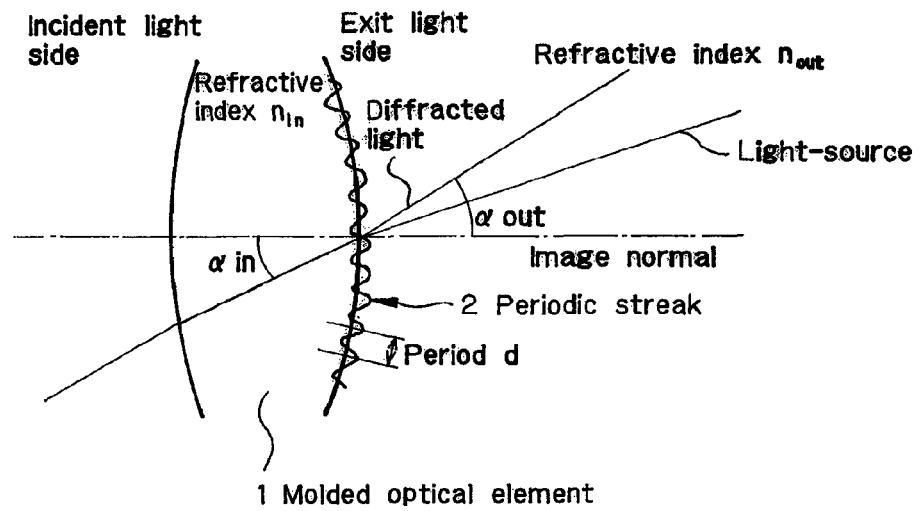
FIG. 21 is illustrative of the definitions of the respective signs in Condition (4).

Here let $\alpha_{in}$ be the angle of light of wavelength λ with a surface normal upon incidence on an optucal surface having a periodic streak, $n_{in}$ be the refractive index of the side of the optical surface on which light rays are incident, $n_{out}$ be the refractive index of the side of the optical surface which the light rays leave, and d be the period of the streak produced on the optical surface. The diffracted light is produced in the same direction as the periodic direction of the streak, and its angle $\alpha_{out}$ with the surface normal may generally be given by the following equation (4). The definitions of the signs in equation (4) are shown in FIG. 21, which is prior art.

$$n_{in} \times \sin \alpha_{in} - n_{out} \times \sin \alpha_{out} = \lambda/d \quad (4)$$

Figure 22:
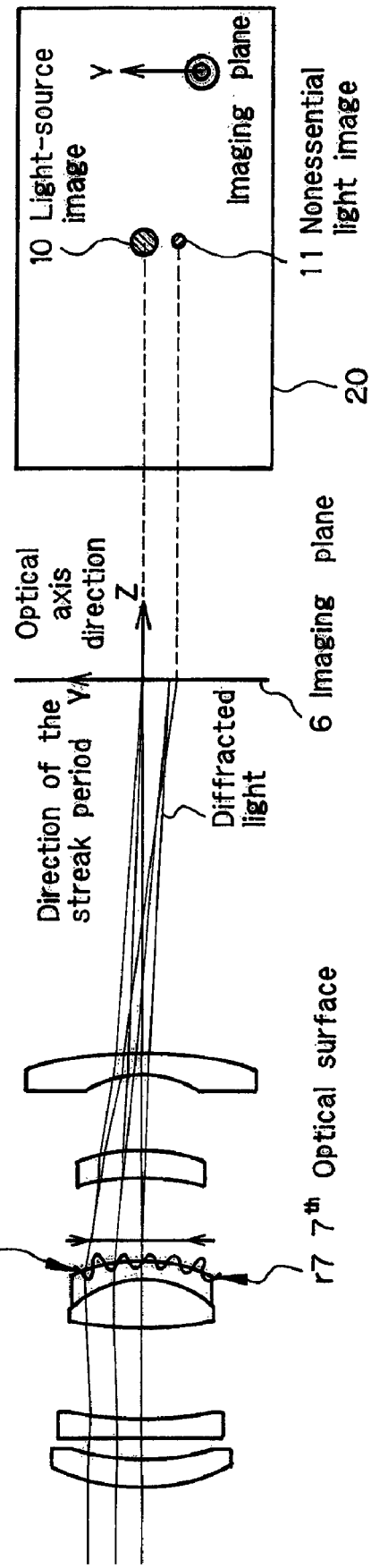
FIG. 22 is illustrative of how the nonessential light image occurs at a position different from the position of a light source image depending on the periodic streak on the molded optical element.

If this diffracted light enters the imaging area 20 of the CCD where the imaging information about the subject is let in, there will be a nonessential image 11 occurring in a teaken image, as shown in FIG. 22, which is prior art. In what follows, the diffracted light here will be referred to as nonessential light.

Therefore, if the period of the streak 2 or the optical parameters that define the collecting/diverging performance of the optical system 5 included between the optical surface having the streak 2 and the imaging plane 6 is corrected in such a way as to keep the nonessential light image within the range of a light-source image, it is then possible to make the nonessential light less noticeable without recourse to any polishing, even with the periodic streak 2 produced on the optical surface of the molded optical element.

Figure 23:
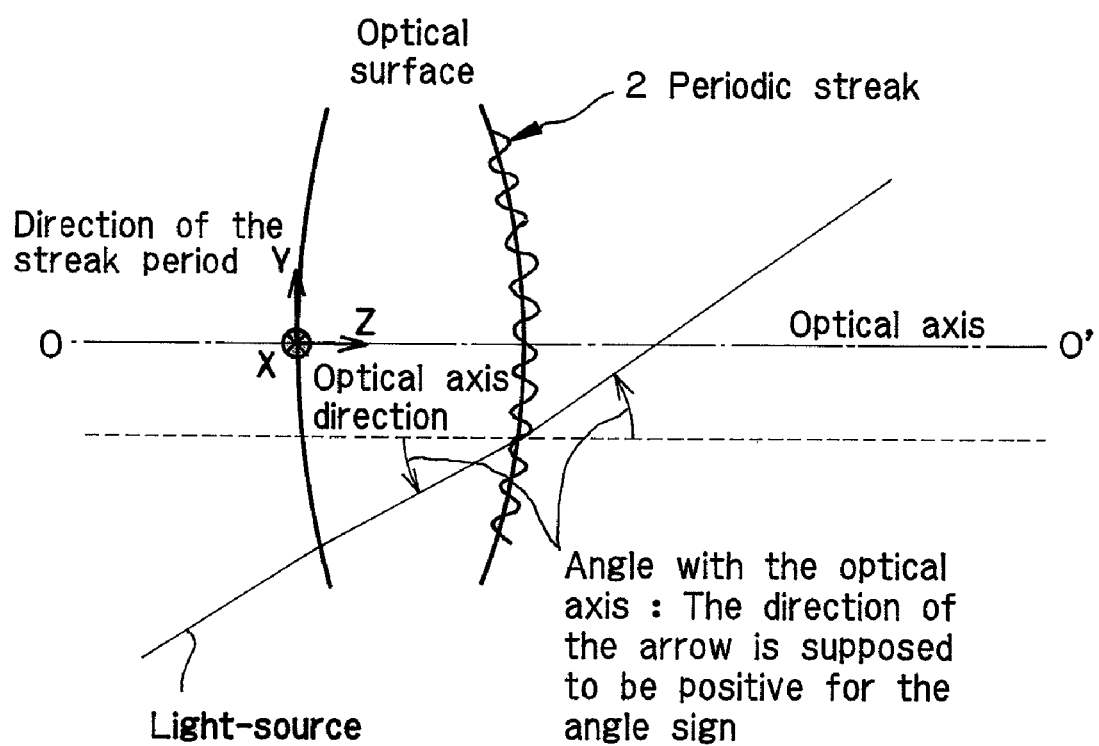
FIG. 23 is illustrative of the definitions of a coordinate system and the direction of angle in inventive Examples.

The coordinate system and the direction of angle here are now defined, as shown in FIG. 23. Throughout all the examples given below, the position and angle of light rays are supposed to be based on the definitions of that coordinate system and angle sign. The coordinate positions for light rays are supposed to be given by local coordinates with the center of each optical surface as the origin and a right-handed system with the Z axis in the optical axis direction (the Y-axis is supposed to be in the same direction as the periodic direction of the streak 2, and the X-axis is supposed to be vertical to the Y- and Z-axes. The angles of light rays are supposed to be with the optical axis, with the plus sign indicative of counterclockwise rotation on the YZ plane (the direction from the Z axis to the Y axis).

Set out below are examples of the inventive optical system wherein by correction of the period of the streak 2, the nonessential light is made less noticeable without recourse to any polishing, even with the periodic streak 2 produced on the optical surface.

EXAMPLE 1

In the example here, when 700 nm wavelength light enters the center of the optical system of FIG. 20 where the $7^{th}$ surface $r_7$ of the fourth lens L4 has a 12 μm period streak, the position of occurrence of the nonessential light on the imaging plane 6 is Y=−2.884 mm: as shown in FIG. 22, the nonessential light image 11 in addition to the light-source image 10 is going to be taken in the image 20.

As can generally be seen from equation (4), the relation of the exit angle $\alpha_{out}$ of nonessential light to the period d of the streak is that the longer the period, the smaller the exit angle $\alpha_{out}$ of the nonessential light becomes.

As shown in FIG. 3, if the exit angle of the non-essential light is small, then it takes an optical path closer to the light-source; so the distance between the nonessential image light 11 and the light-source image 10 on the imaging plane 6 becomes short.

Figure 6:
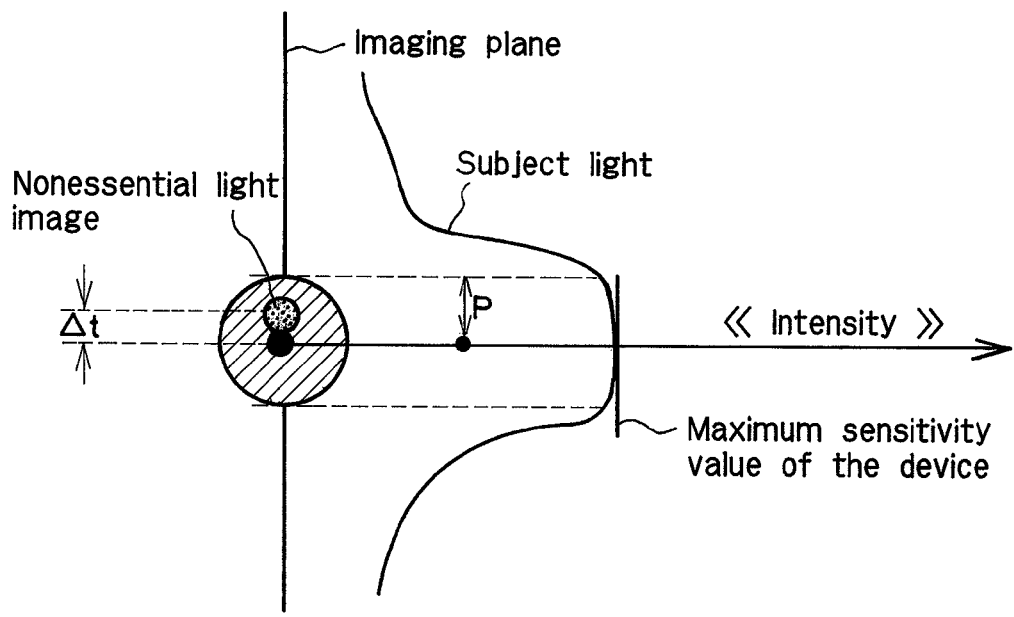
FIG. 6 is illustrative of the relations between the distance P between the light intensity peak position of the subject image and the boundary of an area where the intensity of the subject images exceeds the saturation sensitivity of the light receptor element and the distance $\Delta t$ between the light intensity peak position of the subject image and the light intensity peak position of the nonessential light image.

In the invention, to make the nonessential light less noticeable, correction may as well be implemented thereby increasing the period of the streak 2 so that, as shown in FIG. 6, the distance Δt between the light intensity peak position of the nonessential light image 11 resulting from the periodic streak 2 and the light intensity peak position of the subject image 10 is shorter than the distance P between the light intensity peak position of the subject image 10 and the boundary of the area where the intensity of the subject image 10 exceeds the saturation sensitivity of the light receptor element.

Figure 24:
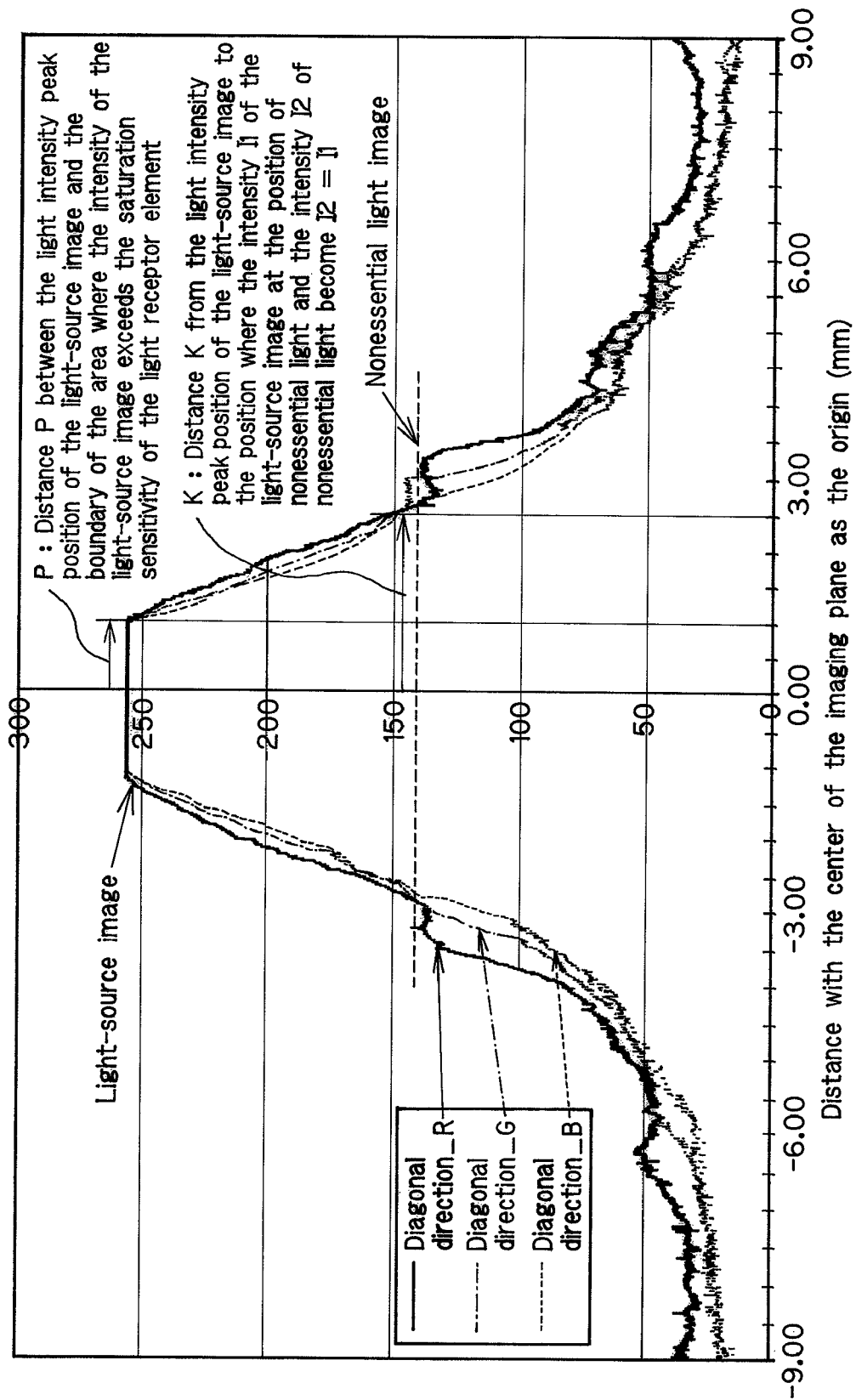
FIG. 24 is illustrative of an intensity profile in section in the diagonal direction of an imaging device when the light source for the subject is taken on an auto-program.

Here, FIG. 24 is illustrative of the intensity profile in section of an imaging device in its diagonal direction in the event that the light source for a subject is taken on an autoprogram. From the results, it is seen that in the example here, the distance P between the light intensity peak position of the light-source image 10 and the boundary of the area where the intensity of the light-source image 10 exceeds the saturation sensitivity of the light receptor element becomes P=1 mm.

Referring to the incidence of the light-source on the center of the optical system, it is when the streak 2 having a period of 35 μm is produced on the $7^{th}$ surface $r_7$ of the fourth lens L4 in the optical system of FIG. 20 that the nonessential light is down at the position of P=1 mm: the exit angle θ of the nonessential light with the optical axis on the optical surface having the streak 2 of this period becomes −1.146°. From known ray tracing of this nonessential light, it is found that the position occurrence of the nonessential light on the imaging plane 6 is Y=−0.986 mm.

Because the light-source enters the center of the optical system, Δt becomes 0.986 mm that is smaller than the size of the light-source image: P=1 mm.

Therefore, if correction and processing is implemented in such a way as to produce the streak 2 having a period longer than 35 μm on the $7^{th}$ surface $r_7$ of the fourth lens L4, it is then possible to make the non-essential light less noticeable without recourse to any polishing.

Figure 8:
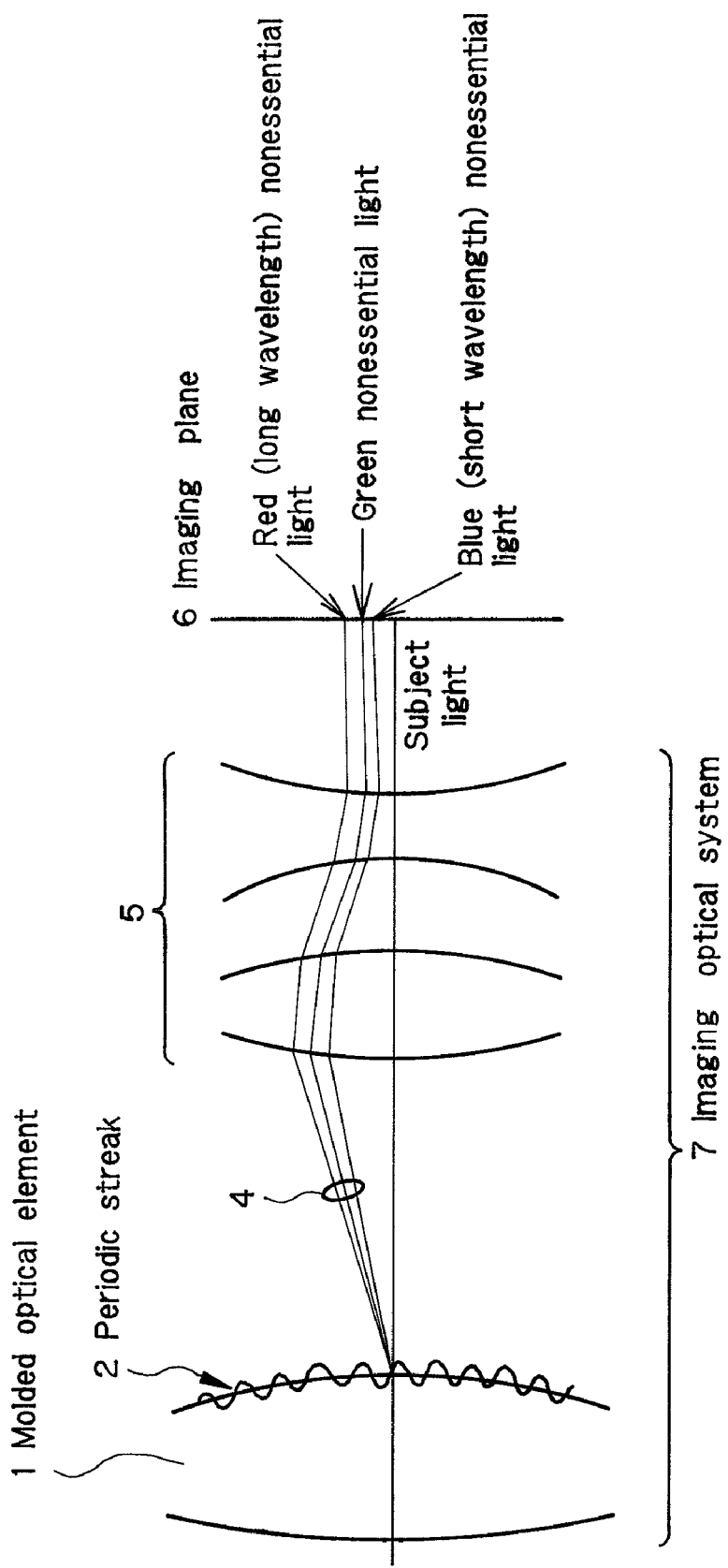
FIG. 8 is illustrative of the position of formation of the nonessential light image on the imaging plane varying from wavelength to wavelength.

As can also be appreciated from equation (4), the direction of exit of the nonessential light resulting from the periodic streak 2 depends on wavelength; so when the light source emits white light, the position of occurrence of the nonessential light varies from color (wavelength) to color so that the redder (longer) the color (wavelength), the more away the nonessential light is spaced from the light-source image. Accordingly, if the red (long wavelength) nonessential light is made less noticeable as shown in FIG. 8, the nonessential light of other colors, too, can be made less noticeable at the same time.

Investigation is now made of the positions of 700 nm, 587 nm, and 380 nm wavelength nonessential light on the imaging plane 6 when there is a 35 μm period streak 2 on the $7^{th}$ surface $r_7$ of the fourth lens L4 in the optical system of FIG. 20. It is seen that the exit angle θ of the 700 nm wavelength nonessential light becomes −1.146°, and from known ray tracing for this nonessential light, it is learned that the position of occurrence of the non-essential light on the imaging plane 6 is Y=−0.986 mm; namely, Δt is 0.986 mm that is smaller than the size of the light-source image: P=1 mm.

Of the 587 nm wavelength nonessential light, the exit angle θ becomes −0.962°, and from known ray tracing for this nonessential light, it is learned that the position of occurrence of that nonessential light on the imaging plane 6 is Y=−0.829 mm; namely, Δt is 0.829 mm that is smaller than the size of the light-source image: P=1 mm.

Of the 380 nm wavelength nonessential light, the exit angle θ becomes −0.622°, and from known ray tracing for this nonessential light, it is learned that the position of occurrence of that nonessential light on the imaging plane 6 is Y=−0.540 mm; namely, Δt is 0.540 mm that is smaller than the size of the light-source image: P=1 mm.

Accordingly, to make nonessential light less noticeable with respect to all wavelengths of the light-source, the nonessential light of the longest wavelength arriving at the imaging plane via the imaging optical system may as well be made less noticeable.

The example here is explained as having the longest wavelength of 700 nm, because light having a wavelength longer than 700 nm is cut off through the optical system.

Figure 7:
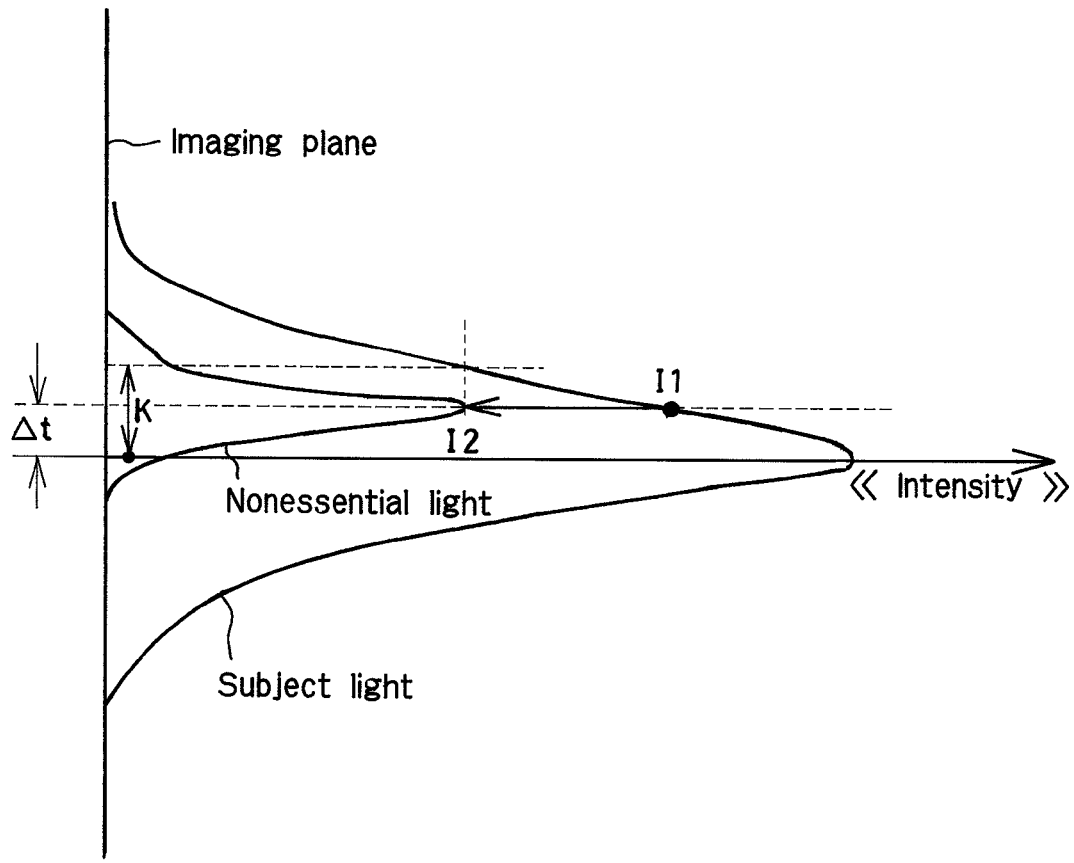
FIG. 7 is illustrative of the intensity I1 and I2 relations.

Further, to make the nonessential light less noticeable in the invention, the period of the streak 2 may as well be corrected such that the intensity I2 of the nonessential light is less than the intensity I1 of the light-source image at the position of occurrence of the nonessential light, as shown in FIG. 7.

Here, FIG. 24 is illustrative of the intensity profile in section of the imaging device in its diagonal direction in the event that the light source for the subject is taken on an autoprogram.

From the results, it is understood that the distance K from the light intensity peak position of the light-source image to the position where I1=I2 becomes K=2.5 mm.

Referring to the incidence of light-source on the center of the optical system, it is when the streak 2 having a period of 14 μm is produced on the $7^{th}$ surface $r_7$ of the fourth lens L4 in the optical system of FIG. 20 that the nonessential light is down at the position of K=2.5 mm.

The exit angle θ of the nonessential light with the optical axis on the optical surface having the streak 2 of this period becomes −2.866°. From known ray tracing for this nonessential light, it is found that the position occurrence of the non-essential light on the imaging plane 6 is Y=−2.470 mm. Because the light-source enters the center of the optical system, Δt becomes 2.470 mm that is smaller than the distance K=2.5 mm.

Therefore, if correction and processing is implemented in such a way as to produce the streak 2 having a period longer than 14 μm on the $7^{th}$ surface $r_7$, it is then possible to make the nonessential light less noticeable.

With such correction, the nonessential light can be made less noticeable without recourse to any polishing, even when the intensity of the nonessential light is strong.

According to the invention, when the light of the longest wavelength λ arriving at the imaging plane via the imaging optical system enters the center of the optical system, the period of the streak 2 for making the non-essential light less noticeable may be found from the following equation (1).

$$Q > \{f + (SB - fB)(SF - fF)/f\} \times \sin^{-1}(\lambda/nd) \qquad (1)$$

Figure 9:
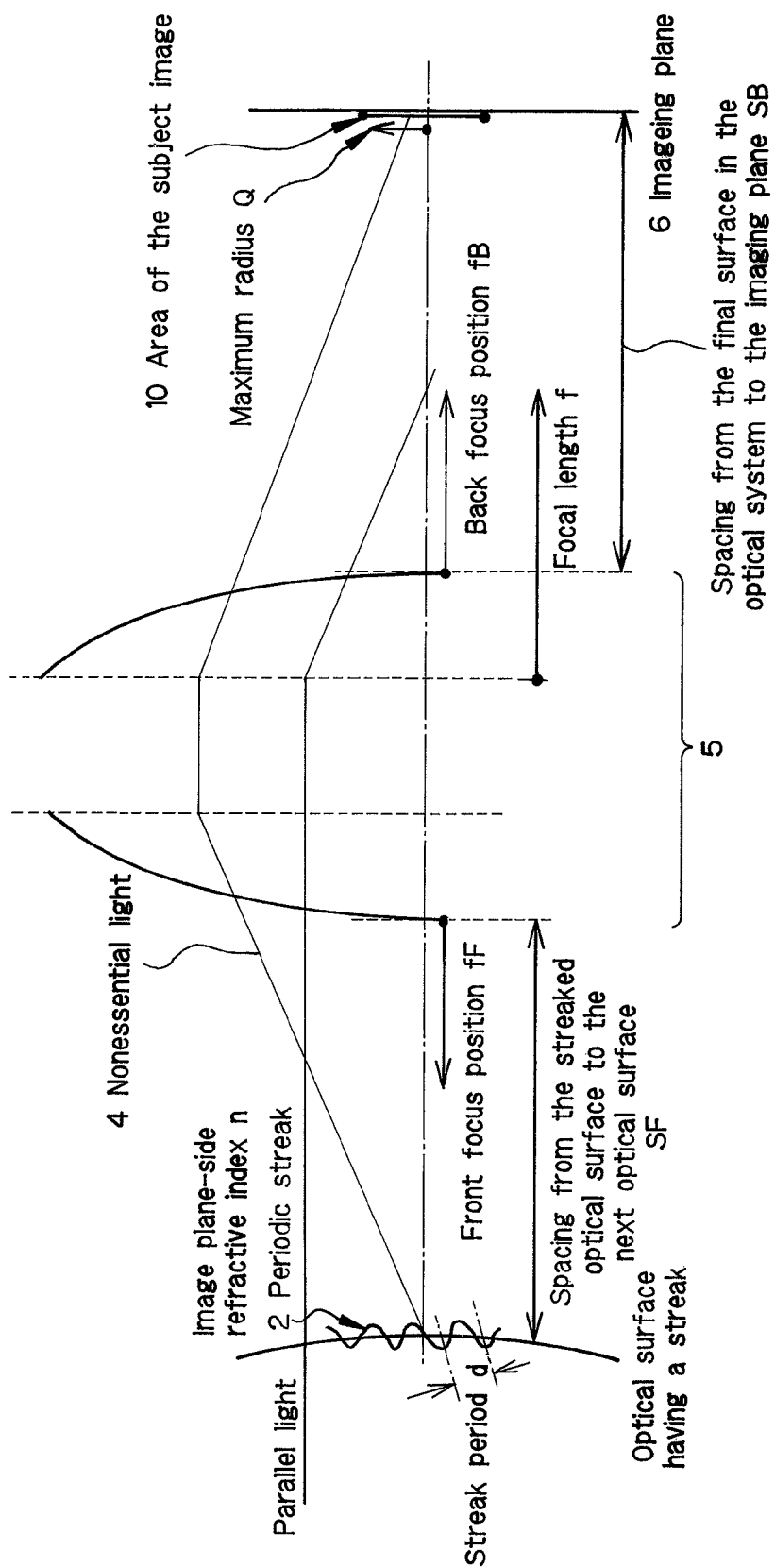
FIG. 9 is illustrative of the parameters Q, n, d, f, fF, fB, SF and SB.
Figure 10:
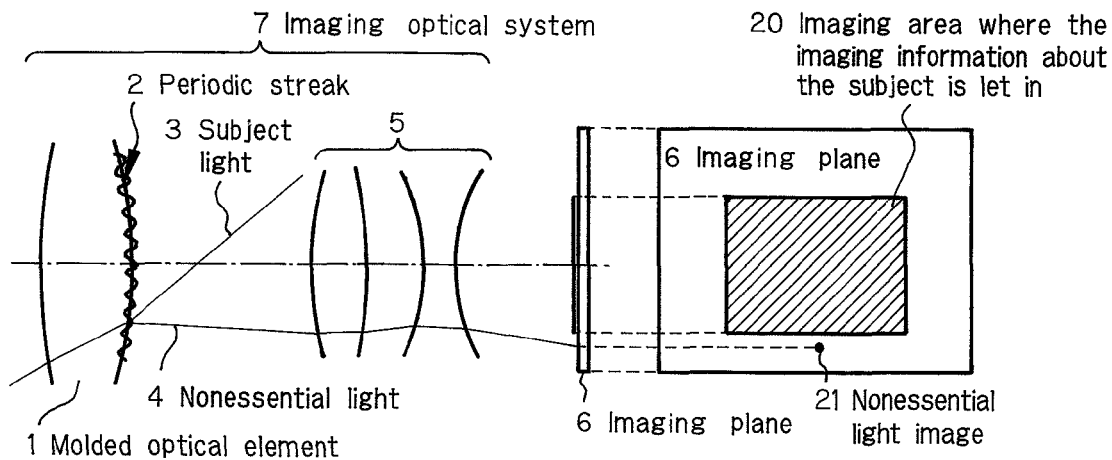
FIG. 10 is illustrative of how the subject image and the nonessential light image are formed with the imaging apparatus according to the second aspect of the invention.
Figure 11:
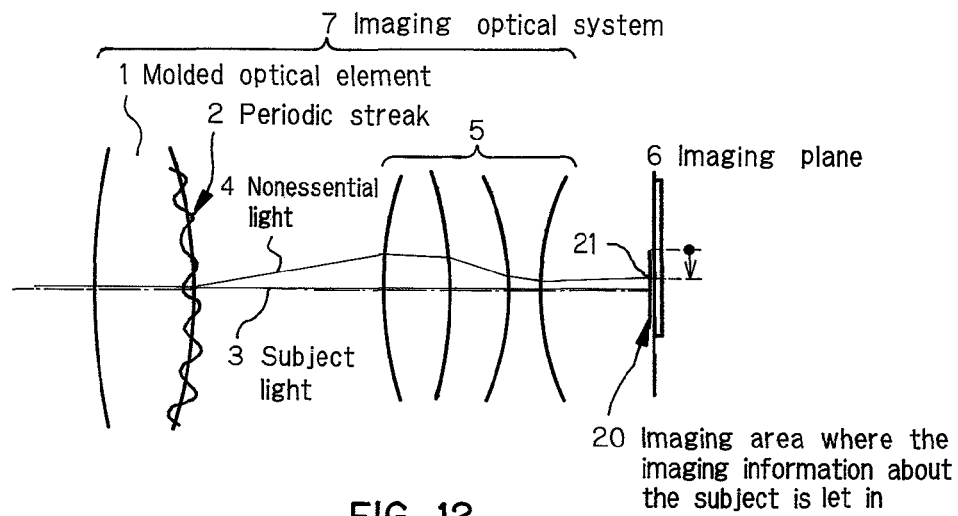
FIG. 11 is illustrative of how the nonessential light image is formed when there is none of the parameters determined with the imaging apparatus according to the second aspect of the invention.

Here Q is the maximum radius of the area of the subject image, n is the refractive index on the image plane side of the streaked optical surface, d is the period of the periodic streak on the streaked optical surface, f is the focal length of the optical system included between the streaked optical surface and the imaging plane, fF is the front focus position, fB is the back focus position, SF is the spacing between the streaked optical surface and the next optical surface on the imaging plane side, and SB is the spacing between the final surface of the optical system included between the streaked optical surface and the imaging plane and the imaging plane, as shown in FIG. 9.

Set out in Table 2 are the focal length f of the optical system from the $8^{th}$ surface $r_8$ to the $12^{th}$ surface $r_{12}$, the front focus position fF, the back focus position fB, the spacing SF between the $7^{th}$ surface $r_7$ and the $8^{th}$ surface $r_8$, the spacing SB between the $12^{th}$ surface $r_{12}$ and the imaging plane ($r_{13}$), the wavelength λ, and the refractive index n of the $7^{th}$ surface $r_7$ on the imaging plane side.

When the maximum radius Q of the area of the subject image 10 is defined as the distance P between the light intensity peak position of the subject image 10 and the boundary of the area where the intensity of the light-source image exceeds the saturation sensitivity of the light receptor element, Q=1 mm, because P=1 mm in the example here.

Solving the relation (1) with respect to d while using the figures of Table 2 and taking the size of the light-source image as Q=1 mm, the period d of the streak 2 is found to be greater than 31.8 μm.

Accordingly, if processing and correction is implemented in such a way as to produce a streak having a longer period on the $7^{th}$ surface $r_7$, it is then possible to make the nonessential light less noticeable.

When, because the intensity of the nonessential light is strong, the maximum radius Q of the area of the subject image is defined as the distance K from the light intensity peak position of the light-source image to the position where I1=I2, Q=2.5 mm, because K=2.5 mm in the example here.

Solving the relation (1) with respect to d while using the figures of Table 2 and taking the size of the light-source image as Q=2.5 mm, the period d of the streak 2 is found to be greater than 12.7 μm.

Accordingly, if processing and correction is implemented in such a way as to produce a streak having a longer period on the $7^{th}$ surface $r_7$, it is then possible to make the nonessential light less noticeable.

With the use of relation (1), it is thus possible to easily figure out the period d of the streak 2 for making the nonessential light less noticeable depending on the size of the subject image.

As described above, the period of the streak 2 is corrected in such a way as to keep the nonessential light 11 within the range of the light-source image 10, so that even when there is the periodic streak 2 produced on the optical surface of the molded optical element 1, the nonessential light can be made less noticeable without recourse to any polishing.

EXAMPLE 2

Set out below is an example of the inventive imaging apparatus wherein optical parameters that define the collecting/diverging performance of an optical system included between a streaked optical surface and an imaging plane are so corrected that even with a periodic streak produced on the optical surface, there can be the non-essential light prevented from generation without recourse to any polishing.

In the example here, when 700 nm wavelength light enters the center of the optical system of FIG. 20 where the $7^{th}$ surface $r_7$ of the fourth lens L4 has a 12 μm period streak, the position of occurrence of the nonessential light on the imaging plane 6 is Y=−2.884 mm: as shown in FIG. 22, the non-essential light image 11 in addition to the light-source image 10 is going to be taken in the image 20.

Figure 4:
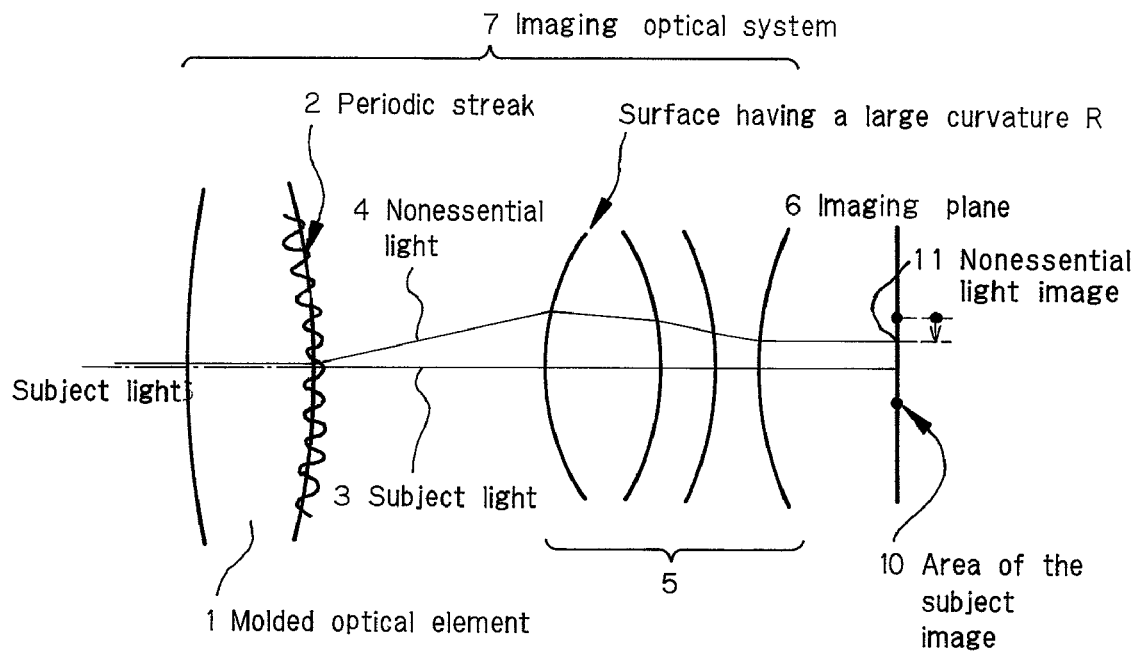
FIG. 4 is illustrative of how the nonessential light image becomes less noticeable by increasing the curvature of a positive power surface at the rear of the streaked optical surface.

Generally when the optical system 5 included between the optical surface having the streak 2 and the imaging plane 6 has convex power, as shown in FIG. 4, the greater the curvature R of the surface having that positive power, the more largely light rays are refracted; if the refracting power of the optical system 5 subsequent to the optical surface having the streak 2 is increased, then the nonessential light image 11 is going to be formed nearer to the subject image 10.

Figure 5:
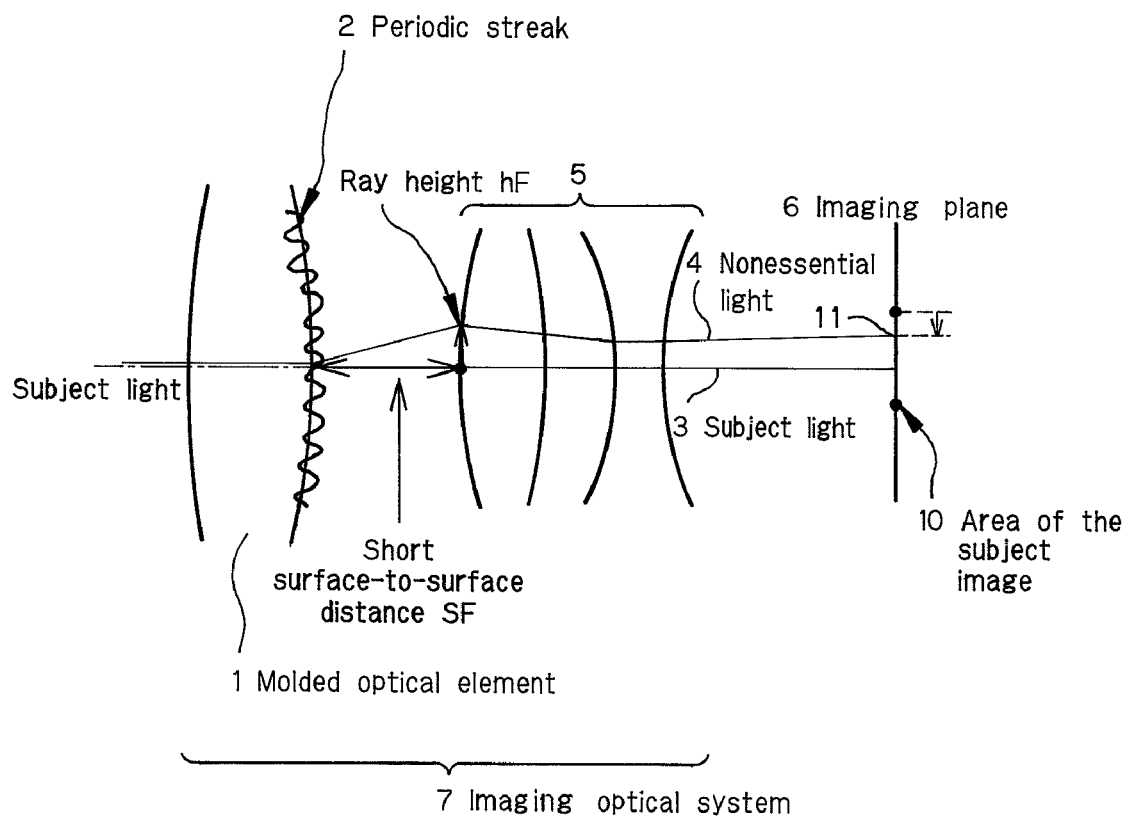
FIG. 5 is illustrative of how the nonessential light images becomes less noticeable by making short the distance from the streaked optical surface to the subsequent first surface of the optical system.

As shown in FIG. 5, the shorter the distance SF between the optical surface having the streak 2 and the subsequent first surface of the optical system 5, the lower the position of incidence of the nonessential light on the subsequent surface goes; so the nonessential light image 11 is going to be formed nearer to the subject image 10.

Accordingly, by making correction of at least one of optical parameters that define the collecting/diverging performance of the optical system 5 included between the optical surface having the streak 2 and the imaging plane 6, such as the curvature and material (refractive index) of each optical surface and the surface-to-surface spacing, the nonessential light can be made less noticeable without recourse to polishing of the optical surface having the streak 2.

To make the nonessential light less noticeable according to the invention here, as shown in FIG. 6, the optical system parameters may as well be corrected such that the distance Δt between the light intensity peak position of the nonessential light image 11 resulting from the periodic streak 2 and the light intensity peak position of the subject image 10 is shorter than the distance P between the light intensity peak position of the subject image 10 and the boundary of the area where the intensity of the light-source image exceeds the saturation sensitivity of the light receptor element.

Here again, FIG. 24 is illustrative of the intensity profile in section of an imaging device in its diagonal direction in the event that the light source for the subject is taken on an autoprogram. From the results, it is seen that in the example here, the distance P between the light intensity peak position of the light-source image and the boundary of the area where the intensity of the light-source image exceeds the saturation sensitivity of the light receptor element becomes P=1 mm.

Therefore, correction was made of the radius of curvature and surface-to-surface spacing of the optical system at the rear of the $7^{th}$ surface $r_7$ of the fourth lens L4 in the optical system of FIG. 20, as set out in Table 3. With the corrected optical system, however, the $1^{st}$ surface $r_1$ to the $6^{th}$ surface $r_6$, too, are corrected for the purpose of letting it be the same in specifications as the optical system of FIG. 20.

From known ray tracing for the nonessential light when there is the period of the aforesaid streak 2 present on the $7^{th}$ surface $r_7$ of the corrected optical system, the position of occurrence of the nonessential light on the imaging plane 6 is found to be Y=−0.935 mm. Now that the light-source enters the center of the optical system, Δt becomes 0.935 mm that is smaller than the size of the light-source image: P=1 mm.

Therefore, if the optical system of FIG. 20 is corrected as set out in Table 3, it is then possible to make the nonessential light less noticeable.

As can be appreciated from equation (4), the direction of exit of the nonessential light resulting from the periodic streak 2 depends on wavelength; so when the light source emits white light, the position of occurrence of the nonessential light varies from color (wavelength) to color so that the redder (longer) the color (wavelength), the more away the nonessential light is spaced from the light-source image. Accordingly, if the red (long wavelength) nonessential light is made less noticeable as shown in FIG. 8, the nonessential light of other colors, too, can be made less noticeable at the same time.

Investigation is now made of the positions of 700 nm, 587 nm, and 380 nm wavelength nonessential light on the imaging plane 6 when there is a 12 μm period streak 2 on the $7^{th}$ surface $r_7$ of the fourth lens L4 in the optical system of FIG. 20 corrected as in Table 3. It is seen that the exit angle θ of the 700 nm wavelength nonessential light becomes −3.344°, and from known ray tracing for this nonessential light, it is learned that the position of occurrence of the nonessential light on the imaging plane 6 is Y=−0.935 mm; namely, Δt is 0.935 mm that is smaller than the size of the light-source image: P=1 mm.

Of the 587 nm wavelength nonessential light, the exit angle θ becomes −2.806°, and from known ray tracing for this nonessential light, it is learned that the position of occurrence of that nonessential light on the imaging plane 6 is Y=−0.783 mm; namely, Δt is 0.783 mm that is smaller than the size of the light-source image: P=1 mm.

Of the 380 nm wavelength nonessential light, the exit angle θ becomes −1.815°, and from known ray tracing for this nonessential light, it is learned that the position of occurrence of that nonessential light on the imaging plane 6 is Y=−0.501 mm; namely, Δt is 0.501 mm that is smaller than the size of the light-source image: P=1 mm.

Accordingly, to make nonessential light less noticeable with respect to all wavelengths of the light-source, the nonessential light of the longest wavelength arriving at the imaging plane via the imaging optical system may as well be made less noticeable.

The example here is explained as having the longest wavelength of 700 nm, because light having a wavelength longer than 700 nm is cut off through the optical system.

Further, to make the nonessential light less noticeable in the invention, the optical system may as well be corrected such that the intensity I2 of the nonessential light is less than the intensity I1 of the light-source image at the position of occurrence of the nonessential light, as shown in FIG. 7.

Here again, FIG. 24 is illustrative of the intensity profile in section of the imaging device in its diagonal direction in the event that the light source for the subject is taken on an autoprogram.

From the results, it is understood that the distance K from the light intensity peak position of the light-source image to the position where I1=I2 becomes K=2.5 mm.

Therefore, the radius of curvature and the surface-to-surface spacing in the optical system after the $7^{th}$ surface $r_7$ of the fourth lens L4 in the optical system of FIG. 20 were corrected as in Table 4. With the corrected optical system, however, the $1^{st}$ $r_1$ surface to the $6^{th}$ surface $r_6$, too, are corrected for the purpose of letting it be the same in specifications as the optical system of FIG. 20.

From known ray tracing for this nonessential light when there is the aforesaid streak period on the $7^{th}$ surface $r_7$ in that corrected optical system, it is learned that the position of occurrence of the nonessential light on the imaging plane 6 is Y=−2.445 mm. Now that the light-source enters the center of the optical system, Δt becomes 2.445 mm that is smaller than the distance K=2.5 mm.

Accordingly, if the optical system of FIG. 20 is corrected as in Table 4, it is then possible to make the nonessential light less noticeable.

With such correction, it is possible to make the nonessential light less noticeable even when its intensity is strong.

According to the invention here, the relation (1) described in Example 1 may be used to figure out the correction conditions for the optical system to make the nonessential light less noticeable.

That is, as relation (1) is modified to the following relation (1a), its right side is going to contain only parameters about the optical system included between the optical surface having the streak 2 and the imaging plane 6. In other words, correction of the parameters of the optical system may as well be implemented in such a way as to satisfy relation (1a).

$$Q/\sin^{-1}(\lambda/nd) > f + (SB-fB)(SF-fF)/f \tag{1a}$$

When the maximum radius Q of the area of the subject image 10 is defined as the distance P between the light intensity peak position of the subject image 10 and the boundary of the area where the intensity of the light-source image exceeds the saturation sensitivity of the light receptor element, Q=1 mm, because P=1 mm in the example here.

When there is a 12 μm period streak 2 on the $7^{th}$ surface $r_7$ of the fourth lens L4 in the optical system of FIG. 20, with substitution of the wavelength λ=700 nm, the imaging plane-side refractive index n=1 and the light-source image size Q=1 mm for the left side of relation (1a), the right side may as well be equal to or less than 17.114. In other words, correction may just as well be implemented of the optical parameters that define the collecting/diverging performance of the optical system 5 included between the optical surface having the streak 2 and the imaging plane 6, thereby satisfying that.

Regarding the optical system located after the 7th surface $r_7$ of the fourth lens L4 in the optical system of FIG. 20 and corrected as in table 3, the focal length f of the optical system from the $8^{th}$ surface $r_8$ to the $12^{th}$ surface $r_{12}$, the front focus position fF, the back focus position fB, the spacing SF between the $7^{th}$ surface $r_7$ and the $8^{th}$ surface $r_8$, the spacing SB between the $12^{th}$ surface $r_{12}$ and the imaging plane 6 ($r_{13}$), the wavelength λ, and the image plane-side refractive index n of the $7^{th}$ surface $r_7$ are as set out in Table 5.

Regarding this corrected optical system, the value of the right side of relation (1a) is found to be 1.192 that satisfies the requirement of being less than 17.114.

Because the intensity of the nonessential light image is strong, when the maximum radius Q of the area of the subject image 10 is defined as the distance K from the light intensity peak position of the light-source image from the position where I1=I2, Q=2.5 mm, because K=2.5 mm in the example here.

When there is a 12-μm period streak 2 on the $7^{th}$ surface $r_7$ of the fourth lens L4 in the optical system of FIG. 20, with substitution of the wavelength λ=700 nm, the imaging plane-side refractive index n=1 and the light-source image size Q=1 mm for the left side of relation (1a), the right side may as well be equal to or less than 42.784. In other words, correction may just as well be implemented of the optical parameters that define the collecting/diverging performance of the optical system 5 included between the optical surface having the streak 2 and the imaging plane 6, thereby satisfying that.

Regarding the optical system located after the $7^{th}$ surface $r_7$ of the fourth lens L4 in the optical system of FIG. 20 and corrected as in table 4, the focal length f of the optical system from the $8^{th}$ surface $r_8$ to the $12^{th}$ surface $r_{12}$, the front focus position fF, the back focus position fB, the spacing SF between the $7^{th}$ surface $r_7$ and the $8^{th}$ surface $r_8$, the spacing SB between the $12^{th}$ surface $r_{12}$ and the imaging plane 6 ($r_{13}$), the wavelength λ, and the image plane-side refractive index n of the $7^{th}$ surface $r_7$ are as set out in table 6.

Regarding this corrected optical system, the value of the right side of relation (1a) is found to be 38.491 that satisfies the requirement of being less than 42.784.

With the use of relation (1a), it is thus possible to figure out the conditions for the optical system to make the nonessential light less noticeable.

Figure 25:
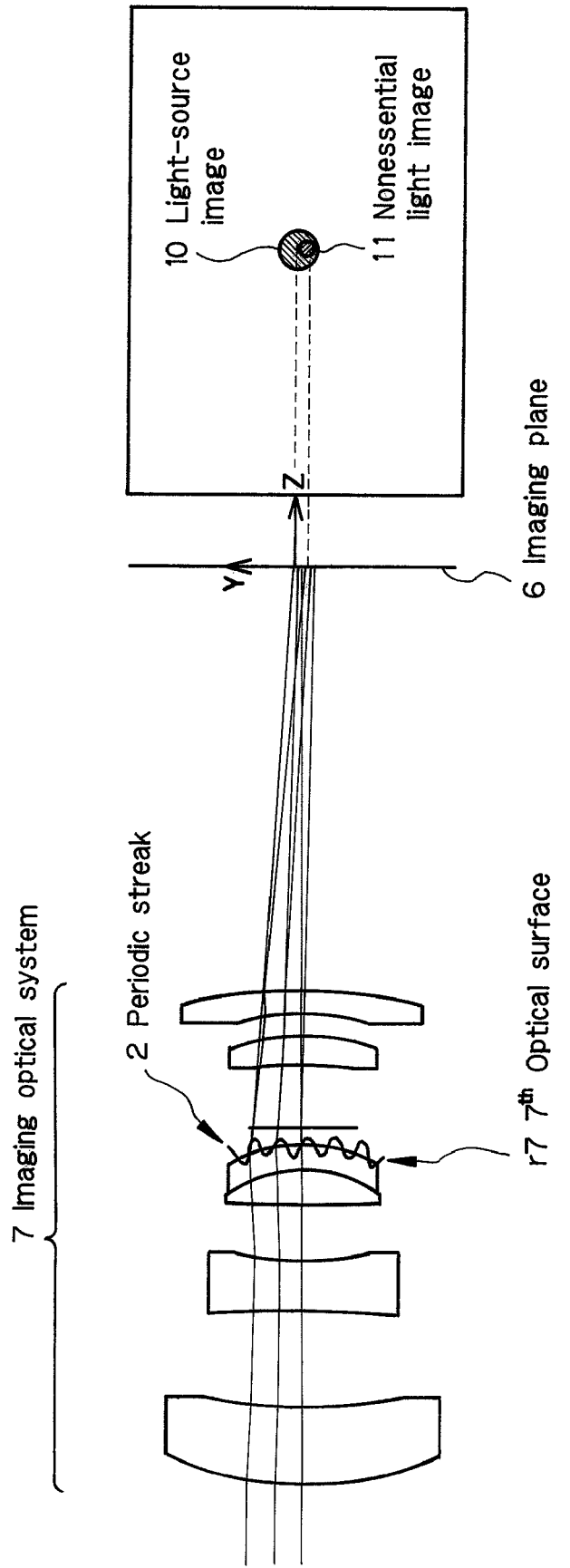
FIG. 25 is illustrative of how the nonessential light image is kept within the range of the subject in Examples 1 and 2.

As exemplified in Examples 1 and 2, and as illustrated in FIG. 25, the period of the streak 2 is corrected or, alternatively, correction is made of at least one of the optical parameters that define the collecting/diverging performance of the optical system 5 included between the optical surface having the streak 2 and the imaging plane 6 such as the curvature and material (refractive index) of each optical surface and the surface-to-surface spacing, thereby enabling the nonessential light to be less noticeable without recourse to any polishing, even when there is the periodic period 2 produced on the surfaces of the molded optical element 1.

Also, even when correction of the streak period cannot be implemented by processing techniques, the optical parameters such as the curvature and material (refractive index) of each optical surface and the surface-to-surface spacing can be optimized thereby making the nonessential light less noticeable.

Examples of the imaging apparatus according to the second aspect of the invention are now explained.

Figure 26:
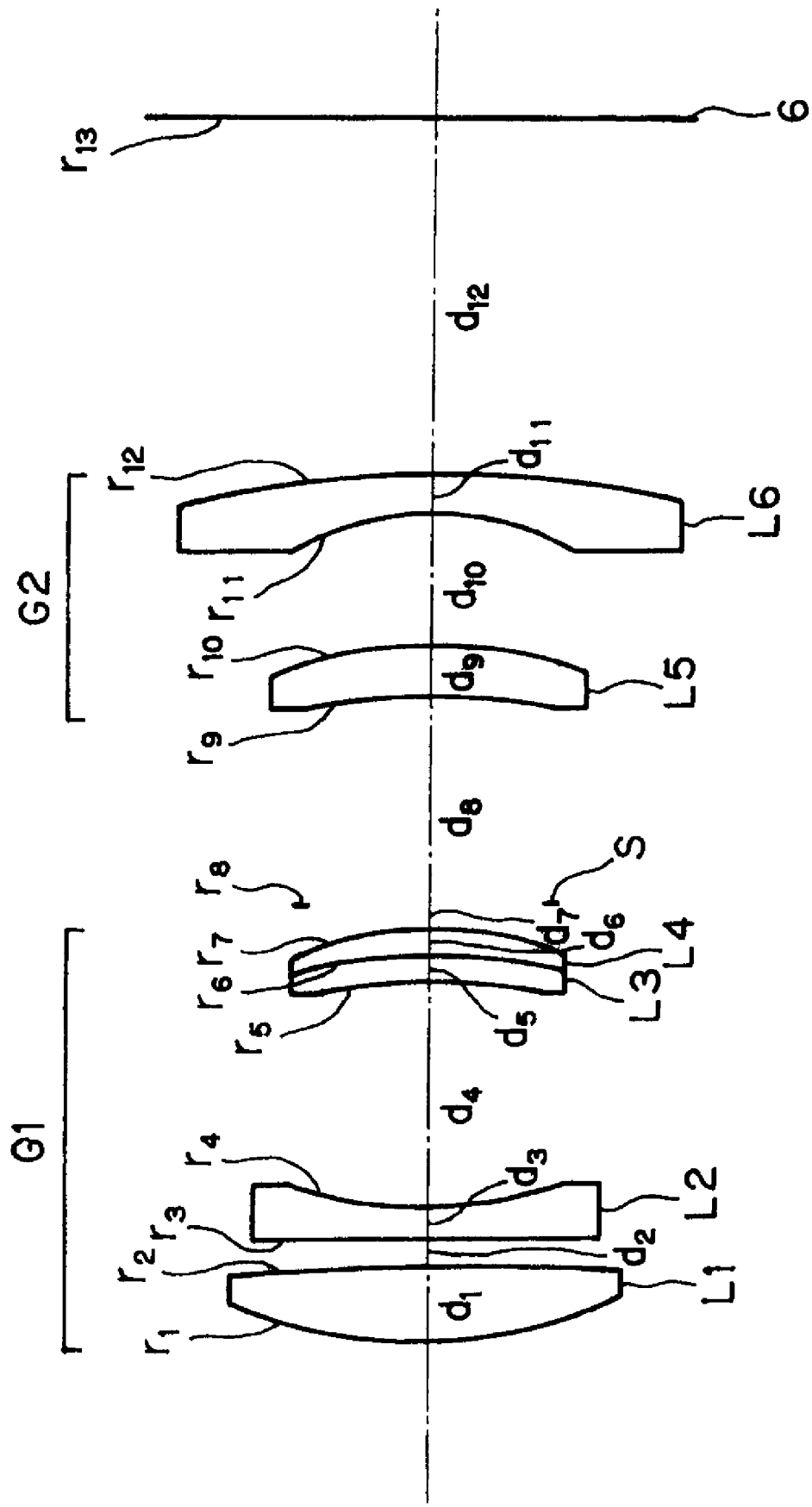
FIG. 26 is illustrative in section and schematic of the imaging optical systems used in Examples 3 and 4.

FIG. 26 is illustrative in section and schematic of an example of another imaging optical system.

What is illustrated in FIG. 26 is an imaging optical system having an F-number of 5.8 and a focal length of 50 mm, and consisting of, in order from its object side, a first lens group G1 having a positive focal length and a second lens group G2 having a negative focal length with a stop S interposed between them. In order from the object side, the first lens group G1 is made up of a positive first lens L1 and a negative second lens L2, and a positive third lens L3 and a fourth lens L4 having a cementing surface, and the second lens group G2 is made up of a fifth lens L5 defined by a positive meniscus lens convex on an imaging plane side and a sixth lens L6 defined by a negative meniscus lens concave on the object side.

There will be numerical data on this imaging optical system shown in Table 7 given later, wherein $E_1$, $E_2$ ... are each indicative of an effective diameter determined by the lenses, a lens holder and the stop. The $4^{th}$ surface $r_4$, and the $9^{th}$ surface $r_9$ of this imaging optical system is aspheric.

Light emanating from the subject transmits through the optical surfaces $r_1$ to $r_{12}$ in FIG. 26, and is imaged on an imaging plane (the $13^{th}$ surface $r_{13}$) having a CCD image sensor placed on it, which has a diagonal length of 22.3 mm and a pixel pitch of 0.0053 mm, thereby taking a subject image.

Of the lenses forming a part of the imaging optical system of FIG. 26, the third lens L3, and the fourth lens L4 is a molded optical element whose optical surfaces may possibly have a periodic streak, because of having been fabricated through a fabrication process likely to give rise to such a periodic streak. Upon incidence on the optical surface having that periodic streak of sunlight or light from a high-brightness illuminator instrument, there is diffracted light produced.

Figure 27:
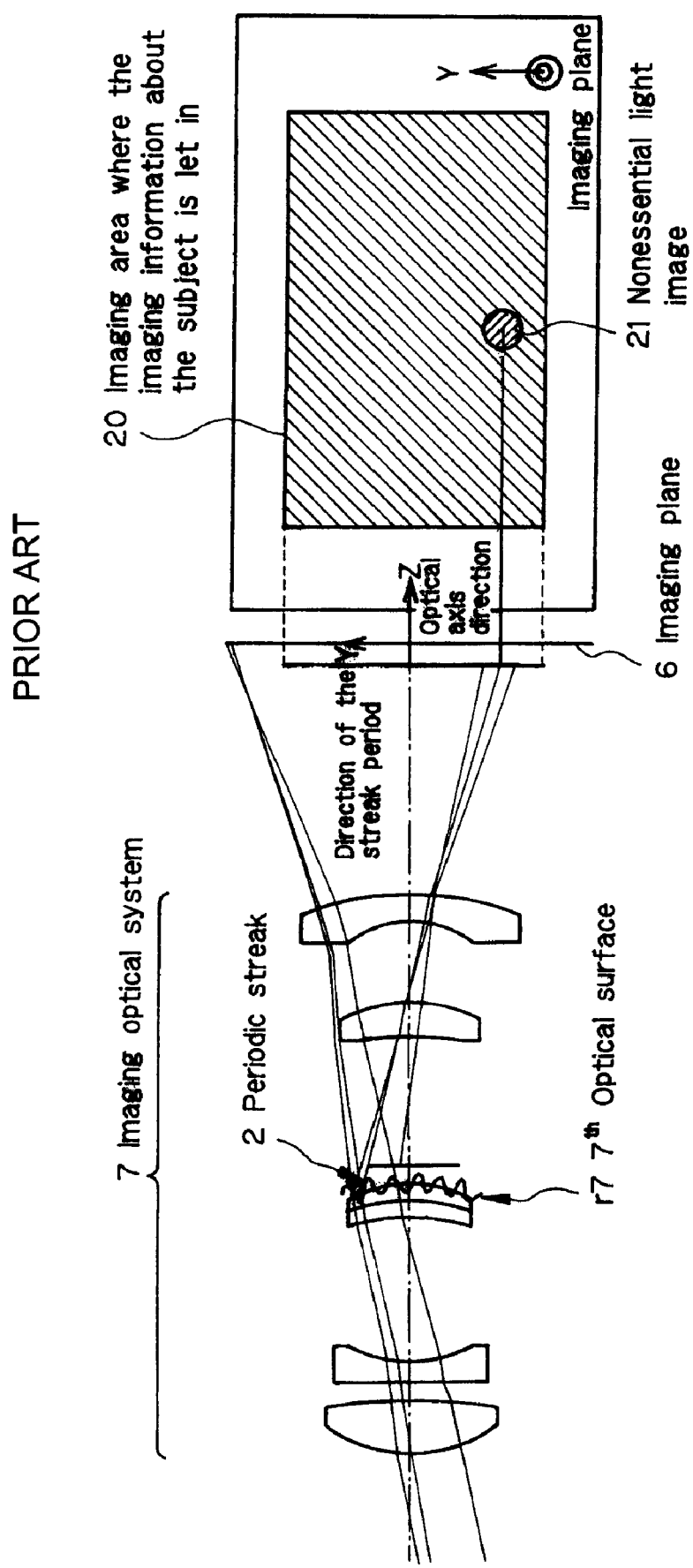
FIG. 27 is illustrative of how the nonessential light image is brought by the periodic streak on the molded optical element in a taken image.

If this diffracted light enters the imaging area 20 of the CCD where the imaging information about the subject is let in, there will be the nonessential light image 21 occurring in a taken image, as shown in FIG. 27. In what follows, the diffracted light here will be referred to as nonessential light.

Therefore, by correcting the period of the streak 2 or the optical parameters that define the collecting/diverging performance of the optical system 5 included between the optical surface having the streak 2 and the imaging plane 6 in such a way that the nonessential light image 21 leaves the imaging area 20 where the imaging information about the subject is obtained, it is possible to prevent nonessential light from being produced in taken images without recourse to any polishing, even when there is the periodic streak 2 produced on the optical surface of the molded optical element.

Set out below is an example of the inventive optical system wherein by correction of the streak period, non-essential light is prevented from being produced in a taken image without recourse to any polishing, even when there is the periodic streak 2 produced on an optical surface.

EXAMPLE 3

In the example here, when light-source enters at the $7^{th}$ surface $r_7$ of the fourth lens L4 in the optical system of FIG. 26 at a position of Y=4.106 mm and Z=−0.644 mm and at an angle of 14.142° with an optical axis and in the presence of a 0.75 μm period streak 2 on the $7^{th}$ surface $r_7$, the position of occurrence of nonessential light on the imaging plane 6 becomes Y=−7.532 mm; with a digital camera having a CCD having an imaging area having a diagonal length of 22.3 mm, the nonessential light image 21 in addition to the light-source image is going to be taken in an image, as shown in FIG. 27.

As can generally be seen from equation (4), the relation of the exit angle $α_{out}$ of the nonessential light to the period d of the streak is that the shorter the period, the larger the exit angle $α_{out}$ of the nonessential light becomes.

Figure 12:
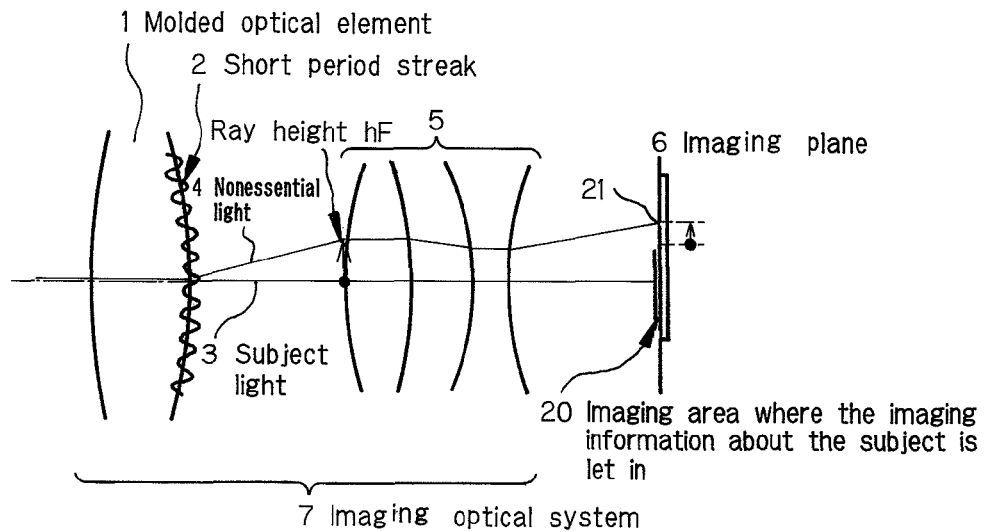
FIG. 12 shows that the shorter the period of the periodic streak, the more unlikely to produce the nonessential light image.

Therefore, if the period of the streak 2 is made short enough to increase the exit angle of the non-essential light, as shown in FIG. 12, then the nonessential light takes an optical path more away from the light-source so that the position of occurrence of the nonessential light image 21 on the imaging plane can be spaced more away from the light-source image.

Referring to the incidence of light-source on the $7^{th}$ surface $r_7$ at the aforesaid position and angle, it is when there is the streak 2 having a period of 0.65 μm on the $7^{th}$ surface $r_7$ that the nonessential light is down on the outside of the aforesaid imaging area 20: the exit angle θ of the nonessential light with the optical axis on the optical surface having the streak 2 of this period becomes −24.827°. From known ray tracing for this nonessential light, it is found that the position occurrence of the nonessential light on the imaging plane 6 is Y=−12.377 mm.

Figure 28:
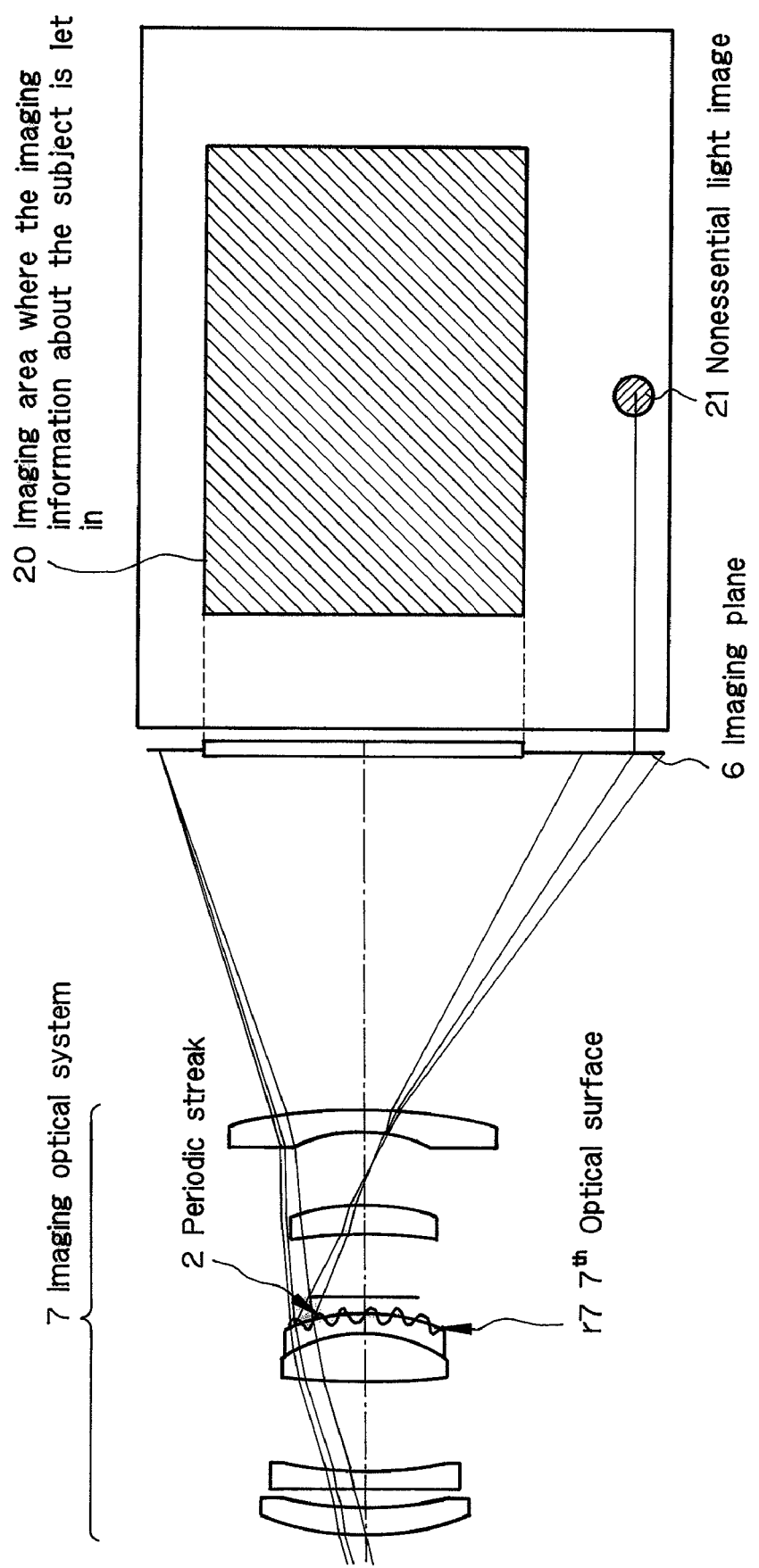
FIG. 28 is illustrative of how there is none of the nonessential light produced in a taken image in Examples 3 and 4.

Therefore, if the digital camera with a CCD having an imaging area having a diagonal length 22.3 mm is corrected and processed in such a way as to produce the streak 2 having a period shorter than 0.65 μm on the $7^{th}$ surface $r_7$, it is then possible to prevent the non-essential light from being produced in the taken image, as shown in FIG. 28.

By correcting the period of the streak produced on the optical surface, it is thus possible to prevent generation of the nonessential light in the taken image without recourse to any polishing.

Figure 18:
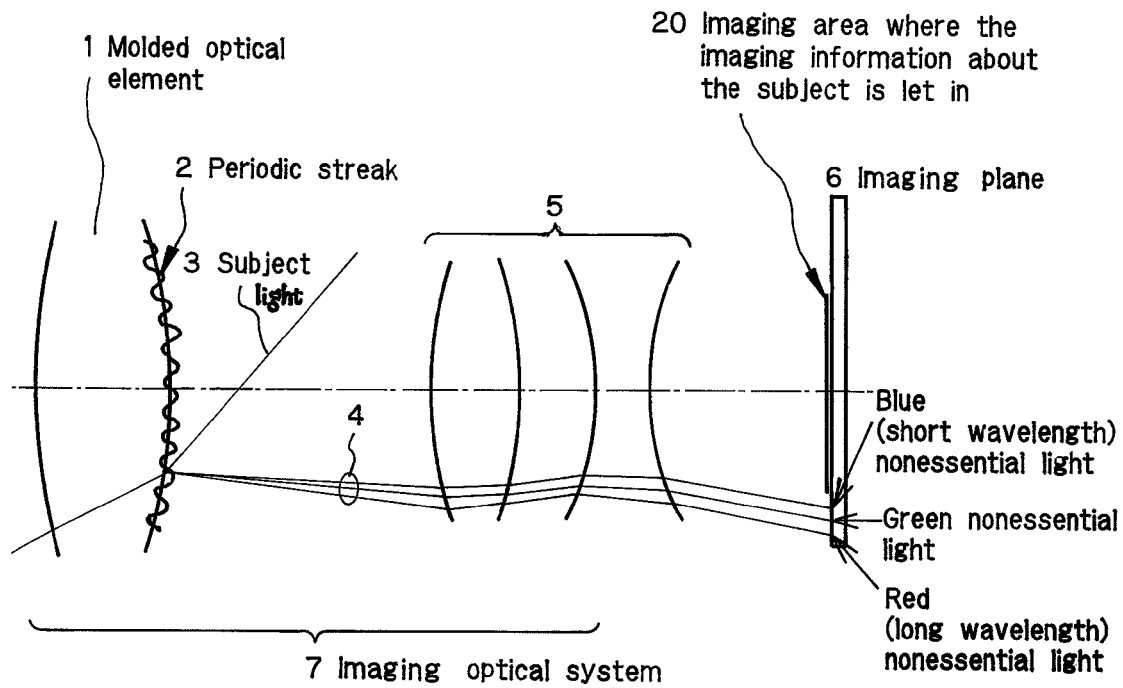
FIG. 18 shows that with the imaging apparatus according to the second aspect of the invention, too, the position of formation of the nonessential light image on the imaging plane varies from wavelength to wavelength.

As can be appreciated from equation (4), the direction of exit of the nonessential light resulting from the periodic streak 2 depends on wavelength; so when the light source emits white light, the position of occurrence of the nonessential light varies from color (wavelength) to color so that the bluer (longer) the color (wavelength), the closer the nonessential light is produced at a position to the light-source. Accordingly, if the blue (long wavelength) nonessential light is let go out of the imaging area 20 where the imaging information about the subject is let in, as shown in FIG. 18, the nonessential light of other colors, too, can be let go out of that imaging area 20 at the same time.

Investigation is now made of the positions of 587 nm, 436 mm, and 380 nm wavelength nonessential light on the imaging plane 6 when there is a 0.65 μm period streak 2 on the $7^{th}$ surface $r_7$ of the fourth lens L4 in the optical system of FIG. 26. It is seen that the exit angle θ of the 587 nm wavelength nonessential light becomes −58.844°, and from known ray tracing for this nonessential light, it is learned that the position of occurrence of the non-essential light on the imaging plane 6 is Y=−91.023 mm out of the imaging area 20 where the imaging information about the subject is let in.

Of the 436 nm wavelength nonessential light, the exit angle θ becomes −31.236°, and from known ray tracing for this nonessential light, it is learned that the position of occurrence of that nonessential light on the imaging plane 6 is Y=−19.228 mm out of the imaging area 20 wherein the imaging information about the subject is let in.

Of the 380 nm wavelength nonessential light, the exit angle θ becomes −24.827°, and from known ray tracing for this nonessential light, it is learned that the position of occurrence of that nonessential light on the imaging plane 6 is Y=−12.377 mm out of the imaging area 20 where the imaging information about the subject is let in.

Therefore, to prevent generation of the nonessential light in the taken image with respect to all wavelengths of the light-source, the nonessential light of the shortest wavelength arriving at the imaging plane via the imaging optical system may as well be prevented from generation in the imaging area 20.

The example here is explained as having the shortest wavelength of 380 nm, because light having a wavelength shorter than 380 nm is cut off through the optical system.

In the example here, with a CCD having an imaging area having a diagonal length of 22.3 mm mounted on the optical system of FIG. 26, the nonessential light can be let go out of the imaging area 20, where the imaging information about the subject is let it, by setting the position of occurrence of the nonessential light on the imaging plane 6 at either +11.15 mm or more or −11.15 mm or less.

Referring to incidence of light-source on the $7^{th}$ surface $r_7$ at a position of Y=3.601 mm and Z=−0.492 mm and at an angle of 12.341° with the optical axis, it is when there is a 0.70 μm period streak 2 on the $7^{th}$ surface $r_7$ of the fourth lens L4 in the optical system of FIG. 26 that the condition of being less than −11.15 mm is satisfied.

The exit angle θ of the nonessential light with respect to the optical axis on the optical surface having the streak 2 of this period becomes −23.414°, and from known ray tracing for this nonessential light, the position of occurrence of the nonessential light on the imaging plane 6 is found to be Y=−11.832 mm: that condition is satisfied.

It is also when there is a 10 μm period streak 2 on the $7^{th}$ surface $r_7$ of the fourth lens L4 in the optical system of FIG. 26 that the condition of being +11.15 mm or more is satisfied.

The exit angle θ of the nonessential light with respect to the optical axis on the optical surface having the streak 2 of this period becomes 7.362°, and from known ray tracing for this nonessential light, the position of occurrence of the nonessential light on the imaging plane 6 is found to be Y=11.223 mm: that condition is satisfied.

Referring here to the incidence of the light-source on the center of the optical system, however, investigations of the nonessential light with the streak of the aforesaid period present on the $7^{th}$ surface $r_7$ indicate that when the streak 2 has a period of 0.70 μm, θ becomes −32.878° and the position of occurrence of the nonessential light on the imaging plane 6 becomes Y=−29.977 mm: the condition of being less than −11.15 mm is satisfied. With a 10 μm period streak 2, however, θ becomes −2.178° and the position of occurrence of the nonessential light on the imaging plane 6 becomes Y=−1.474 mm: the condition of being more than +11.15 mm is not going to be satisfied.

Figure 15:
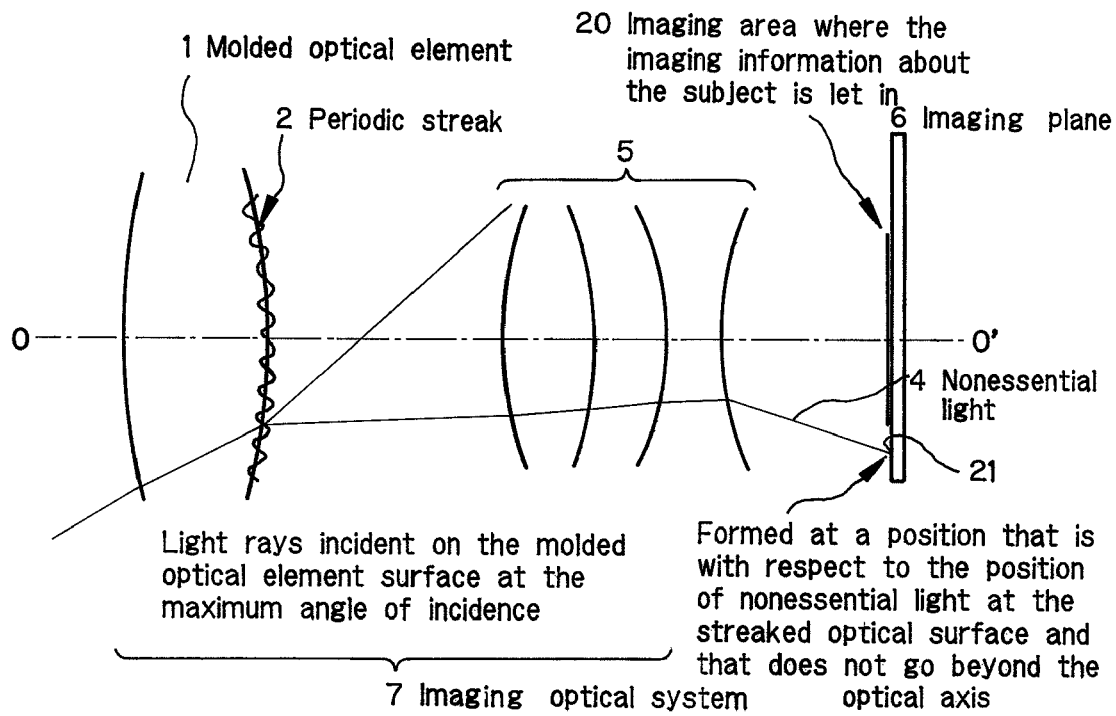
FIG. 15 shows that it is desired that the nonessential light resulting from light rays having the largest angle of incidence does not go beyond the optical axis.
Figure 16:
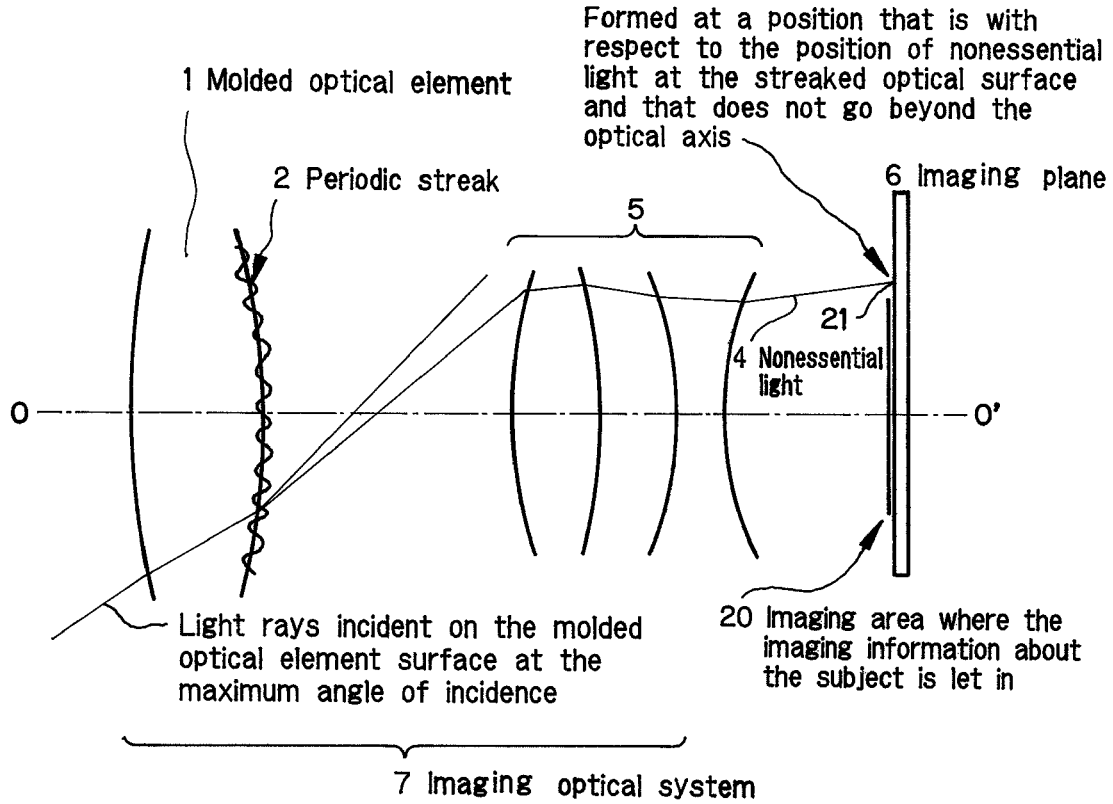
FIG. 16 shows that when the nonessential light resulting from light rays having the largest angle of incidence goes beyond the optical axis, there is a risk of producing the nonessential light image.
Figure 17:
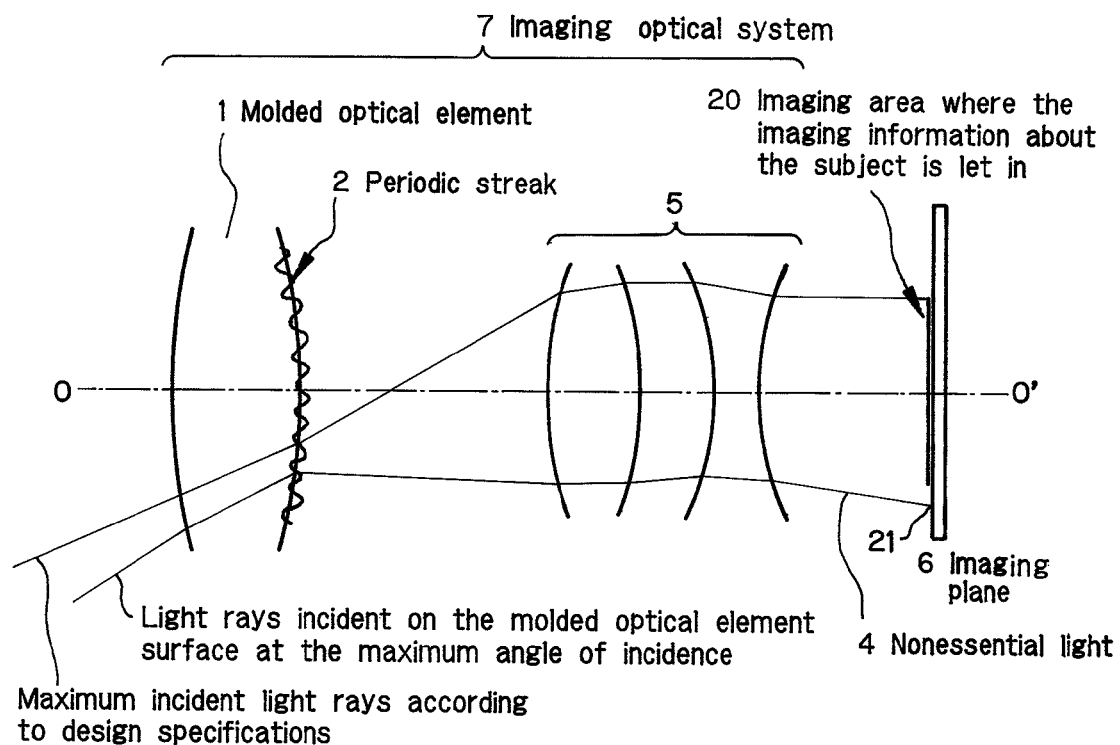
FIG. 17 shows that it is desired that the nonessential light resulting from light rays exceeding the desired largest angle of incidence does not go beyond the optical axis.

Differences in the optical path taken when there are the streaks 2 of such periods are as shown in FIGS. 15 and 16. With the 0.70 μm period streak 2, the nonessential light image on the imaging plane 6 with respect to the position of the nonessential light on the optical surface having the streak 2 is at a position that does not go beyond the optical axis O-O', as shown in FIG. 15.

With the 10 μm period streak 2, on the other hand, the nonessential light image on the imaging plane 6 with respect to the position of the nonessential light on the optical surface having the streak 2 is at a position that goes beyond the optical axis O-O', as shown in FIG. 16.

Therefore, correction of the streak period for preventing generation of the nonessential light in the taken image must be applied to the position where the position of the nonessential light image on the imaging plane 6 with respect to the position of the nonessential light on the optical surface having the streak 2 does not go beyond the optical axis O-O'.

Such correction enables even a digital camera of large CCD size to get rid of the nonessential light in the imaging area, even when there is the periodic streak 2 produced on the optical surface of the molded optical element.

Referring further to correction here for prevention of generation of the nonessential light in the taken images even with incidence of subject light at any angle with the optical system, it must be applied to the nonessential light resulting from light rays, with the maximum angle of incidence, arriving at the optical surface having the streak 2 defined by the diameters of the optical element, the optical element holder and the stop inserted into the optical system.

As can generally be seen from equation (4), the deeper the angle $α_{in}$ of incidence of the light-source, the shallower the exit angle $α_{out}$ of the nonessential light becomes; so the closer the position of occurrence of the nonessential light gets to the imaging area.

Therefore, if the nonessential light resulting from the maximum-angle-of-incident light rays likeliest to get close to the imaging area 20 is stayed off the imaging area 20, then it is also possible to let the nonessential light resulting from light rays at other angles of incidence go out of the imaging area.

In the example here, the maximum angle of incidence of light rays arriving at the $7^{th}$ surface $r_7$ of the fourth lens L4 in the optical system of FIG. 26 is 14.142°. This maximum angle of incidence of light rays is determined by the diameters of the optical elements, the optical element holder and the stop inserted in the optical system; in the example here, it is determined by the effective radius $E_7$ of the $7^{th}$ surface, as set out in Table 7. Upon incidence of the light-source from that maximum angle of incidence of light rays, the exit angle θ of the nonessential light with respect to the optical axis on the optical surface having a 0.70 μm period streak 2 becomes −21.802°; so the position of occurrence of the nonessential light on the imaging plane 6 becomes Y=−9.642 mm, resulting in the occurrence of the nonessential light in the taken image.

To apply correction to this maximum-angle-of-incident light such that the nonessential light is let go out of the imaging area 20 where the imaging information about the subject is let in, there may as well be the streak 2 having a period shorter than 0.60 μm, at which the position of occurrence of the nonessential light becomes Y=−12.377 mm.

With the streak 2 of this period, the position of occurrence of the nonessential light was investigated upon incidence of light rays from other angles smaller than the maximum angle. The results are as set out in Table 8.

That is, when the light-source is incident on the $7^{th}$ surface $r_7$ at a position of Y=3.601 mm and Z=−0.492 mm and at an angle of 12.341° with the optical axis, the exit angle θ of the nonessential light with respect to the optical axis on the optical surface having the streak 2 becomes −26.445°, and from known ray tracing for this essential light, the position of occurrence of the non-essential light on the imaging plane 6 is found to be Y=−14.745 mm with none of the nonessential light in the taken image.

When the light-source is incident on the $7^{th}$ surface $r_7$ at a position of Y=2.245 mm and Z=−0.189 mm and at an angle of 7.616° with the optical axis, the exit angle θ of the nonessential light with respect to the optical axis on the optical surface having the streak 2 becomes −30.358°, and the position of occurrence of the nonessential light on the imaging plane 6 becomes Y=−21.531 mm with none of the nonessential light image in the taken image.

When the light-source enters the center of the optical system, the exit angle θ of the nonessential light with respect to the optical axis on the optical surface having the streak 2 becomes −35.776°, and the position of occurrence of the nonessential light on the imaging plane 6 becomes Y=−34.922 mm with none of the nonessential light image in the taken image.

There is thus none of the nonessential light in the taken image with respect to the incident light from any angle. Therefore, correction of the streak period for the purpose of preventing generation of the nonessential light in the taken image must be applied to the nonessential light resulting from the maximum-angle-of-incident light rays arriving at the optical surface having the streak 2.

With such correction, it is possible to prevent generation of the nonessential light, even when the subject light enters the optical system at any angle.

According to the invention, when light of the shortest wavelength λ arriving at the imaging plane via the imaging optical system enters the center of the optical system, the streak period for making the non-essential light less noticeable may be found from relation (2).-

$$H < \{f + (SB - fB)(SF - fF)/f\} \times \sin^{-1}(\lambda/nd) \quad (2)$$

Figure 19:
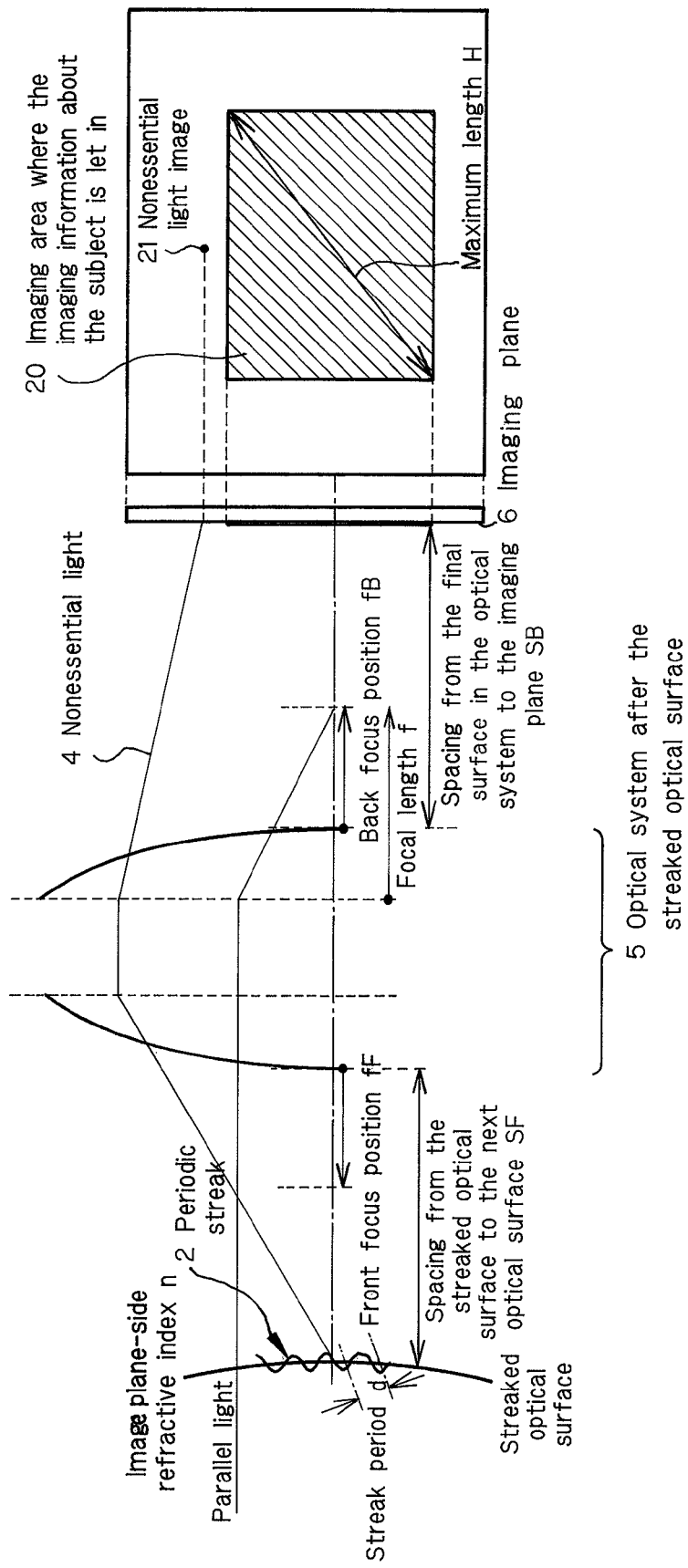
FIG. 19 is illustrative of the parameters H, n, d, f, fF, fB, SF and SB.

Here H is the maximum length of the imaging area 20 where the imaging information about the subject is let in, n is the refractive index on the image plane side of the optical surface having the streak 2, d is the period of the streak 2, f is the focal length of the optical system included between the optical surface having the streak 2 and the imaging plane 6, fF is the front focus position, fB is the back focus position, SF is the spacing between the optical surface having the streak 2 and the next optical surface on the imaging plane side, and SB is the spacing between the final surface of the optical system 5 included between the optical surface having the streak 2 and the imaging plane 6 and the imaging plane 6, as shown in FIG. 19.

In the optical system of FIG. 26, the focal length f of an optical system portion from the $8^{th}$ surface $r_8$ to the $12^{th}$ surface $r_{12}$, the front focus position fF, the back focus position fB, the spacing SF between the $7^{th}$ surface $r_7$ and the $8^{th}$ surface $r_8$, the spacing SB between the $12^{th}$ surface $r_{12}$ and the imaging plane ($r_{13}$), the wavelength λ, and the image plane-side refractive index n of the $7^{th}$ surface $r_7$ are as set out in Table 9.

In the example here, suppose that a digital camera is used with a CCD mounted on it, having an imaging area having a diagonal length of 22.3 mm, and with the maximum length of H=22.3 mm. Solving equation (2) with respect to d while using the figures of Table 9 and H=22.3 mm, the period d of the streak is found to be 1.23 μm.

Therefore, if processing and correction is implemented in such as a away as to produce the streak 2 having a shorter period on the $7^{th}$ surface r7, it is then possible to prevent generation of the nonessential light in the imaging area 20 without recourse to any polishing.

With the use of such relation (2), it is possible to easily figure out the period of the streak 2 for preventing generation of the nonessential light.

EXAMPLE 4

Set out below is an example of the imaging apparatus according to the second aspect of the invention wherein, by correction of the optical parameters that define the collecting/diverging performance of an optical system included between a streaked optical surface and an imaging plane, generation of nonessential light in the imaging area is prevented without recourse to any polishing, even when there is a periodic streak produced on the optical surface.

In the example here, when the light-source is incident on the $7^{th}$ surface r7 of the fourth lens L4 in the optical system of FIG. 26 at a position of Y=4.106 mm and Z=−0.644 mm and at an angle of 14.142° with the optical axis with a 0.75 μm period streak 2 on the $7^{th}$ surface r7, the position of occurrence of the non-essential light on the imaging plane 6 becomes Y=−7.532 mm. With a digital camera with a CCD mounted on it, having an imaging area having a diagonal length of 22.3 mm, the nonessential light image 21 in addition to the light-source image is going to be taken, as in FIG. 27.

Figure 13:
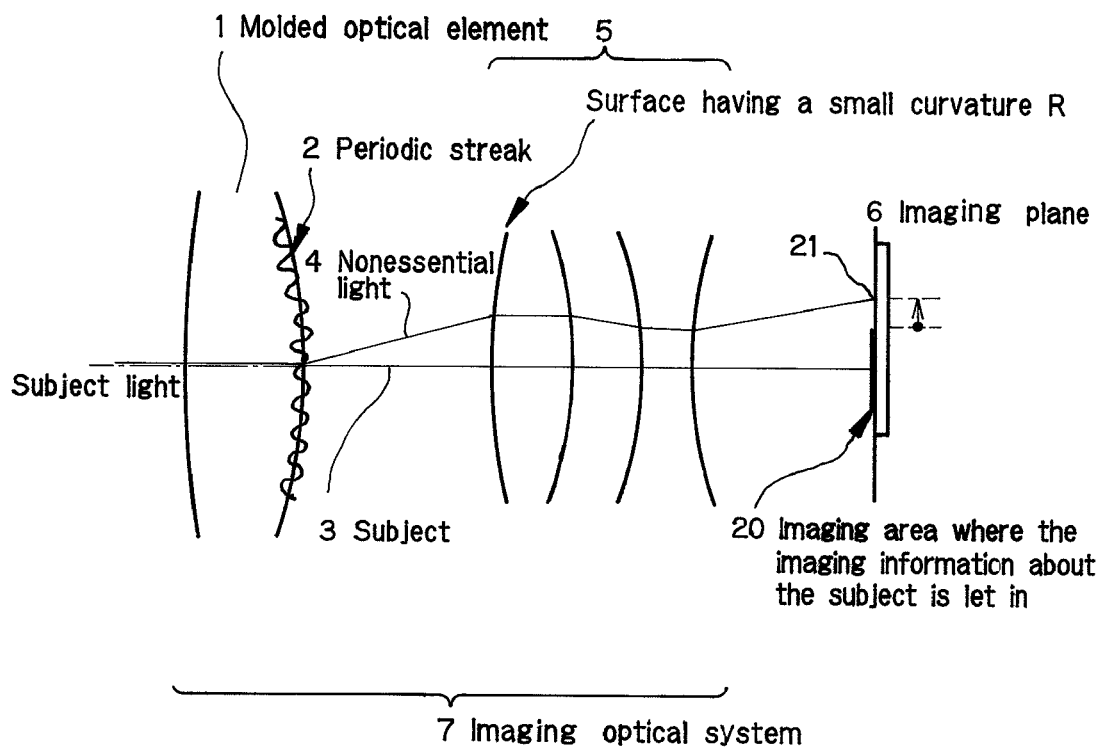
FIG. 13 shows that decreasing the curvature of a positive power surface of the optical system after the streaked optical surface makes it less likely to produce the nonessential light image.

As shown generally in FIG. 13, when the optical system 5 included between the optical surface having the streak 2 and the imaging plane 6 has convex power, the smaller the curvature R of that positive power surface, the more gently light rays are refracted; so the nonessential light image 11 is formed more away from the imaging area 20 if the refracting power of the subsequent optical system 5 is eased up.

Figure 14:
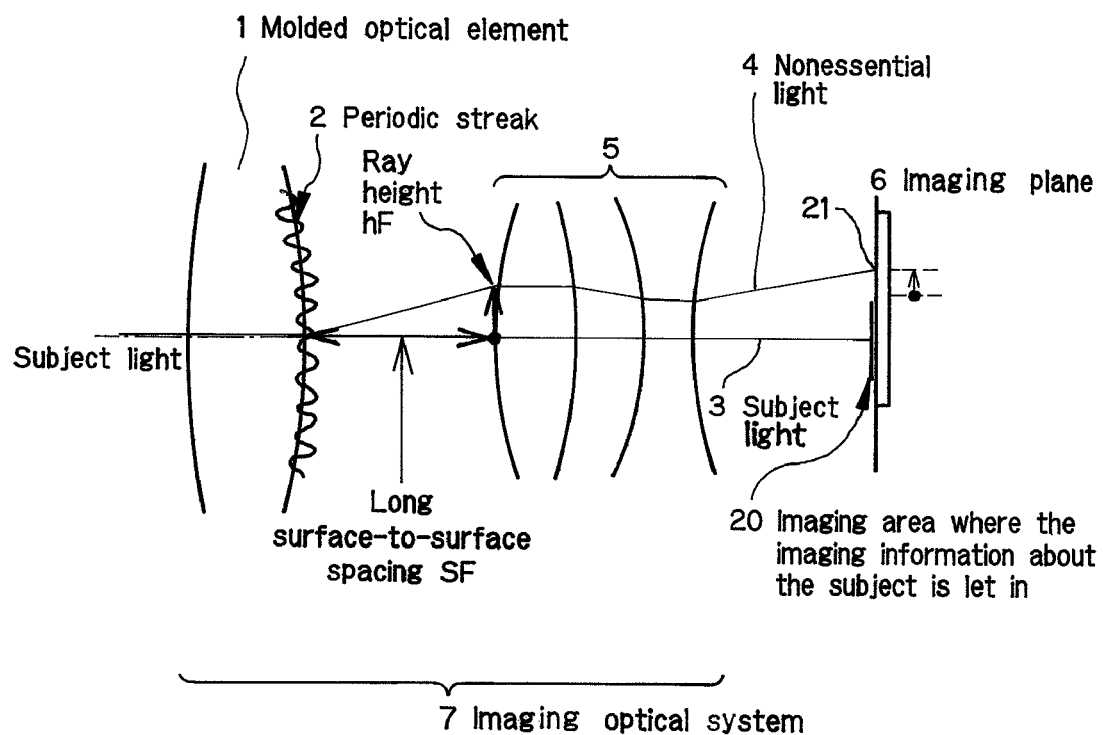
FIG. 14 shows that making long the distance between the streaked optical surface and the subsequent first surface of the optical system makes it less likely to produce the nonessential light image.

As can be seen from FIG. 14, the longer the distance between the optical surface having the streak 2 and the next surface, the higher the position of incidence of the nonessential light on the next surface becomes; so the nonessential light image 11 is going to be formed more away from the subject image.

By correcting at least one of the optical parameters that define the collecting/diverging performance of the optical system included between the surface having the streak 2 and the imaging plane such as the curvature and material (refractive index) of each optical surface and the surface-to-surface spacing, it is thus possible to prevent generation of the nonessential light in the imaging area without recourse to any polishing.

Therefore, the optical system of FIG. 26 was corrected from the distance between the optical surface having the streak 2 and the next surface and the distance from the final surface to the imaging plane 6. The optical system was also corrected from the 1$^{st}$ surface $r_1$ and the 6$^{th}$ surface $r_6$ for the purpose of having the same specifications as the optical system of FIG. 26.

When there is the aforesaid streak period on the 7$^{th}$ surface $r_7$ of that corrected optical system, the light-source incident on the 7$^{th}$ surface $r_7$ at the maximum angle of incidence is defined by the effective diameter $E_7$ of the 7$^{th}$ surface, as set out in Table 7, and when the light is incident on the 7$^{th}$ surface $r_7$ at a position of Y=4.106 mm and Z=−0.644 mm and at an angle of 14.142° with the optical axis, the exit angle θ of the non essential light with respect to the optical axis on the optical surface having the streak 2 becomes −19.284°; from known ray tracing for this nonessential light the position of occurrence of the nonessential light on the imaging plane 6 is found to be Y=−12.977 mm.

With the digital camera with a CCD mounted on it, having an imaging area having a diagonal length of 22.3 mm, if the optical system of FIG. 26 is corrected as set out in Table 10, it is thus possible to prevent the non-essential light from being produced in the taken image, as shown in FIG. 28.

By correcting the parameters of the optical system after the optical surface having the streak 2, it is thus possible to prevent the nonessential light from being produced in the taken image without recourse to any polishing, even when there is the periodic streak 2 produced on the optical surface of the molded optical element.

Investigation is now made of the positions of 587 nm, 436 nm, and 380 nm wavelength nonessential light on the imaging plane 6 when there is a 0.75 μm period streak 2 on the 7$^{th}$ surface $r_7$ of the fourth lens L4 in the optical system of FIG. 26 corrected as set out in Table 10. It is seen that the exit angle θ of the 587 nm wavelength nonessential light becomes −41.313°, and from known ray tracing for this nonessential light, it is learned that the position of occurrence of the nonessential light on the imaging plane 6 is Y=−45.991 mm out of the imaging area 20 where the imaging information about the subject is let in.

Of the 436 nm wavelength nonessential light, the exit angle θ becomes −24.266°, and from known ray tracing for this nonessential light, it is learned that the position of occurrence of that nonessential light on the imaging plane 6 is Y=−18.534 mm out of the imaging area 20 wherein the imaging information about the subject is let in.

Of the 380 nm wavelength nonessential light, the exit angle θ becomes −19.284°, and from known ray tracing for this nonessential light, it is learned that the position of occurrence of that nonessential light on the imaging plane 6 is Y=−12.977 mm out of the imaging area 20 where the imaging information about the subject is let in.

Therefore, to prevent generation of the nonessential light in the taken image with respect to all wavelengths of the light-source, the nonessential light of the shortest wavelength arriving at the imaging plane via the imaging optical system may as well be prevented from generation in the imaging area 20.

The example here is explained as having the shortest wavelength of 380 nm, because light having a wavelength shorter than 380 nm is cut off through the optical system.

According to the invention here, the relation (2) described in Example 3 may be used to figure out the correction conditions for the optical system to get rid of the nonessential light in the imaging area.

That is, as relation (2) is modified to the following relation (2a), its right side is going to contain only parameters about the optical system included between the optical surface having the streak 2 and the imaging plane 6. In other words, correction of the parameters of the optical system may as well be implemented in such a way as to satisfy relation (2a).

$$H/\sin^{-1}(\lambda/nd) < f + (SB-fB)(SF-fF)/f \quad (2a)$$

In the example here, the digital camera with a CCD mounted on it, having an image area having a diagonal length of 22.3 mm, has a maximum height of H=22.3 mm.

When there is a 0.75 μm period streak 2 on the 7$^{th}$ surface $r_7$ of the fourth lens L4 in the optical system of FIG. 26, with substitution of the wavelength λ 380 nm, the imaging plane-side refractive index n=1 and imaging area's maximum length H=22.3 mm for the left side of relation (2a), the right side may as well be more than 37.946. In other words, correction may just as well be implemented of the optical parameters that define the collecting/diverging performance of the optical system included between the optical surface having the streak 2 and the imaging plane 6, thereby satisfying that.

Regarding the optical system located after the 7$^{th}$ surface $r_7$ of the fourth lens L4 in the optical system of FIG. 26 and corrected as in Table 10, set out in Table 11 are the focal length f, the front focus position fF, the back focus position fB, and the 7$^{th}$ surface $r_7$ to 8$^{th}$ surface $r_8$ spacing SF, the spacing SB between the 12$^{th}$ surface $r_{12}$ and the imaging plane 6 ($r_{13}$), the wavelength λ, and the image plane-side refractive index of the 7$^{th}$ surface $r_7$.

Regarding this corrected optical system, the value of the right side of relation (2a) is found to be 49.043 that satisfies the requirement of being more than 37.946.

With the use of relation (2a), it is thus possible to figure out the conditions for the optical system to get rid of the nonessential light.

By correcting at least one of the optical parameters that define the collecting/diverging performance of the optical system 5 included between the optical surface having the streak 2 and the imaging plane 6 such as the curvature and material (refractive index) of each optical surface and the surface-to-surface spacing such that the nonessential light is let go out of the imaging area 20 wherein the imaging information about the subject is let it, it is thus possible to prevent generation of the non-essential light in the imaging area without recourse to any polishing, even when there is the periodic streak 2 produced on the surface of the molded optical element 1.

Also, even when correction of the streak period cannot be implemented by processing techniques, the optical parameters such as the curvature and material (refractive index) of each optical surface and the surface-to-surface spacing can be optimized thereby preventing generation of the nonessential light in the imaging area.

Set out below are Tables 1 through 11.

TABLE 1

| | | | |
|---|---|---|---|
| $r_0 = \infty$ (Object Plane) | $d_0 = \infty$ | | |
| $r_1 = 20.00$ | $d_1 = 1.79$ | $n_{d1} = 1.59$ | $\nu_{d1} = 53.20$ |
| $r_2 = 26.64$ | $d_2 = 1.27$ | | |
| $r_3 = 1771.62$ | $d_3 = 1.20$ | $n_{d2} = 1.59$ | $\nu_{d2} = 29.90$ |
| $r_4 = 42.41$ (Aspheric Surface) | $d_4 = 6.08$ | | |
| $r_5 = 70.00$ | $d_5 = 3.08$ | $n_{d3} = 1.57$ | $\nu_{d3} = 56.33$ |

TABLE 1-continued

| | | | |
|---|---|---|---|
| $r_6 = -10.32$ | $d_6 = 1.38$ | $n_{d4} = 1.81$ | $\nu_{d4} = 25.43$ |
| $r_7 = -13.41$ | $d_7 = 1.00$ | | |
| $r_8 = \infty$ (Stop) | $d_8 = 4.27$ | | |
| $r_9 = -25.45$ (Aspheric Surface) | $d_9 = 1.90$ | $n_{d5} = 1.59$ | $\nu_{d5} = 29.90$ |
| $r_{10} = -18.13$ | $d_{10} = 5.11$ | | |
| $r_{11} = -10.24$ | $d_{11} = 1.40$ | $n_{d6} = 1.72$ | $\nu_{d6} = 47.94$ |
| $r_{12} = -39.12$ | $d_{12} = 25.10$ | | |
| $r_{13} = \infty$ (Imaging Plane) | | | |

Aspheric Coefficient $4^{th}$ Surface $A_4 = 1.12 \times 10^{-4}$
$A_6 = 4.88 \times 10^{-7}$
$A_8 = 1.60 \times 10^{-8}$ $9^{th}$ Surface $A_4 = 3.86 \times 10^{-5}$
$A_6 = 5.37 \times 10^{-7}$
$A_8 = -8.32 \times 10^{-11}$

TABLE 2

| f (mm) | fF (mm) | fB (mm) | SF (mm) | SB (mm) | Refractive Index n | Wavelength λ (nm) |
|---|---|---|---|---|---|---|
| -25.41 | 36.20 | -25.99 | 1.00 | 25.10 | 1.00 | 700.00 |

TABLE 3

| | | | |
|---|---|---|---|
| $r_0 = \infty$ (Object Plane) | $d_0 = \infty$ | | |
| $r_1 = 12.93$ | $d_1 = 3.00$ | $n_{d1} = 1.59$ | $\nu_{d1} = 53.20$ |
| $r_2 = 10.00$ | $d_2 = 3.00$ | | |
| $r_3 = 1771.62$ | $d_3 = 1.20$ | $n_{d2} = 1.59$ | $\nu_{d2} = 29.90$ |
| $r_4 = 20.00$ (Aspheric Surface) | $d_4 = 3.00$ | | |
| $r_5 = -22.00$ | $d_5 = 2.00$ | $n_{d3} = 1.57$ | $\nu_{d3} = 56.33$ |
| $r_6 = -22.00$ | $d_6 = 1.00$ | $n_{d4} = 1.81$ | $\nu_{d4} = 25.43$ |
| $r_7 = -13.41$ | $d_7 = 1.00$ | | |
| $r_8 = \infty$ (Stop) | $d_8 = 3.00$ | | |
| $r_9 = -30.00$ (Aspheric Surface) | $d_9 = 1.90$ | $n_{d5} = 1.59$ | $\nu_{d5} = 29.90$ |
| $r_{10} = -15.00$ | $d_{10} = 1.50$ | | |
| $r_{11} = -45.00$ | $d_{11} = 1.40$ | $n_{d6} = 1.72$ | $\nu_{d6} = 47.94$ |
| $r_{12} = -45.00$ | $d_{12} = 10.00$ | | |
| $r_{13} = \infty$ (Imaging Plane) | | | |

Aspheric Coefficient $4^{th}$ Surface $A_4 = 1.12 \times 10^{-4}$
$A_6 = 4.88 \times 10^{-7}$
$A_8 = 1.60 \times 10^{-8}$ $9^{th}$ Surface $A_4 = 3.86 \times 10^{-5}$
$A_6 = 5.37 \times 10^{-7}$
$A_8 = -8.32 \times 10^{-11}$

TABLE 4

| | | | |
|---|---|---|---|
| $r_0 = \infty$ (Object Plane) | $d_0 = \infty$ | | |
| $r_1 = 20.00$ | $d_1 = 1.79$ | $n_{d1} = 1.59$ | $\nu_{d1} = 53.20$ |
| $r_2 = 22.23$ | $d_2 = 2.79$ | | |
| $r_3 = 1771.62$ | $d_3 = 1.20$ | $n_{d2} = 1.59$ | $\nu_{d2} = 29.90$ |
| $r_4 = 42.41$ (Aspheric Surface) | $d_4 = 6.08$ | | |
| $r_5 = 70.00$ | $d_5 = 3.08$ | $n_{d3} = 1.57$ | $\nu_{d3} = 56.33$ |
| $r_6 = -10.32$ | $d_6 = 1.38$ | $n_{d4} = 1.81$ | $\nu_{d4} = 25.43$ |
| $r_7 = -13.41$ | $d_7 = 1.00$ | | |
| $r_8 = \infty$ (Stop) | $d_8 = 4.00$ | | |
| $r_9 = -25.00$ (Aspheric Surface) | $d_9 = 1.90$ | $n_{d5} = 1.59$ | $\nu_{d5} = 29.90$ |
| $r_{10} = -17.00$ | $d_{10} = 4.00$ | | |
| $r_{11} = -12.00$ | $d_{11} = 1.00$ | $n_{d6} = 1.72$ | $\nu_{d6} = 47.94$ |
| $r_{12} = -39.00$ | $d_{12} = 24.00$ | | |
| $r_{13} = \infty$ (Imaging Plane) | | | |

Aspheric Coefficient $4^{th}$ Surface $A_4 = 1.12 \times 10^{-4}$
$A_6 = 4.88 \times 10^{-7}$
$A_8 = 1.60 \times 10^{-8}$ $9^{th}$ Surface $A_4 = 3.86 \times 10^{-5}$
$A_6 = 5.37 \times 10^{-7}$
$A_8 = -8.32 \times 10^{-11}$

TABLE 5

| f (mm) | fF (mm) | fB (mm) | SF (mm) | SB (mm) | Refractive Index n | Wavelength λ (nm) |
|---|---|---|---|---|---|---|
| -49.10 | 43.16 | -48.55 | 1.00 | 10.00 | 1.00 | 700.00 |

TABLE 6

| f (mm) | fF (mm) | fB (mm) | SF (mm) | SB (mm) | Refractive Index n | Wavelength λ (nm) |
|---|---|---|---|---|---|---|
| -35.64 | 45.11 | -35.90 | 1.00 | 24.00 | 1.00 | 700.00 |

TABLE 7

| | | | | |
|---|---|---|---|---|
| $r_0 = \infty$ (Object Plane) | $d_0 = \infty$ | | | |
| $r_1 = 17.25$ | $d_1 = 2.94$ | $n_{d1} = 1.59$ | $\nu_{d1} = 53.20$ | $E_1 = 6.50$ |
| $r_2 = -82.21$ | $d_2 = 1.00$ | | | $E_2 = 6.21$ |
| $r_3 = 1771.62$ | $d_3 = 1.20$ | $n_{d2} = 1.59$ | $\nu_{d2} = 29.90$ | $E_3 = 5.72$ |
| $r_4 = 17.89$ (Aspheric Surface) | $d_4 = 8.58$ | | | $E_4 = 5.23$ |
| $r_5 = -22.30$ | $d_5 = 1.00$ | $n_{d3} = 1.57$ | $\nu_{d3} = 56.33$ | $E_5 = 4.43$ |
| $r_6 = -21.49$ | $d_6 = 1.00$ | $n_{d4} = 1.81$ | $\nu_{d4} = 25.43$ | $E_6 = 4.46$ |
| $r_7 = -13.41$ | $d_7 = 1.00$ | | | $E_7 = 4.50$ |
| $r_8 = \infty$ (Stop) | $d_8 = 7.83$ | | | $E_8 = 4.17$ |
| $r_9 = -25.45$ (Aspheric Surface) | $d_9 = 1.90$ | $n_{d5} = 1.59$ | $\nu_{d5} = 29.90$ | $E_9 = 5.00$ |
| $r_{10} = -18.13$ | $d_{10} = 5.11$ | | | $E_{10} = 5.21$ |
| $r_{11} = -10.24$ | $d_{11} = 1.40$ | $n_{d6} = 1.72$ | $\nu_{d6} = 47.94$ | $E_{11} = 5.38$ |
| $r_{12} = -39.12$ | $d_{12} = 13.87$ | | | $E_{12} = 5.50$ |
| $r_{13} = \infty$ (Imaging Plane) | | | | |

Aspheric Coefficient $4^{th}$ Surface $A_4 = 1.12 \times 10^{-4}$
$A_6 = 4.88 \times 10^{-7}$
$A_8 = 1.60 \times 10^{-8}$ $9^{th}$ Surface $A_4 = 3.86 \times 10^{-5}$
$A_6 = 5.37 \times 10^{-7}$
$A_8 = -8.32 \times 10^{-11}$

TABLE 8

| Position of light-source at the 7th Surface | | Angle of incidence of light-source with respect to the optical axis at the 7th Surface (°) | Angle of incidence of nonessential light with respect to the optical axis at the 7th Surface (°) | Position of nonessential light at the imaging plane |
|---|---|---|---|---|
| Y-Coordinates | Z-Coordinates | | | |
| 0.000 | 0.000 | 0.000 | −35.776 | −34.922 |
| 1.307 | −0.064 | 4.416 | −32.758 | −26.762 |
| 2.245 | −0.189 | 7.616 | −30.358 | −21.531 |
| 2.835 | −0.303 | 9.657 | −28.724 | −18.480 |
| 3.601 | −0.492 | 12.341 | −26.445 | −14.745 |
| 4.106 | −0.644 | 14.142 | −24.827 | −12.377 |

TABLE 9

| f (mm) | fF (mm) | fB (mm) | SF (mm) | SB (mm) | Refractive Index n | Wavelength $\lambda$ (nm) |
|---|---|---|---|---|---|---|
| −25.41 | 39.76 | −25.99 | 1.00 | 13.87 | 1.00 | 380.00 |

TABLE 10

| | | | |
|---|---|---|---|
| $r_0 = \infty$ (Object Plane) | $d_0 = \infty$ | | |
| $r_1 = 22.00$ | $d_1 = 2.94$ | $n_{d1} = 1.59$  $\nu_{d1} = 53.20$ | $E_1 = 6.50$ |
| $r_2 = -82.21$ | $d_2 = 1.00$ | | $E_2 = 6.21$ |
| $r_3 = 1771.62$ | $d_3 = 1.20$ | $n_{d2} = 1.59$  $\nu_{d2} = 29.90$ | $E_3 = 5.72$ |
| $r_4 = 17.89$ (Aspheric Surface) | $d_4 = 8.58$ | | $E_4 = 5.23$ |
| $r_5 = -22.30$ | $d_5 = 1.00$ | $n_{d3} = 1.57$  $\nu_{d3} = 56.33$ | $E_5 = 4.43$ |
| $r_6 = -21.49$ | $d_6 = 1.00$ | $n_{d4} = 1.81$  $\nu_{d4} = 25.43$ | $E_6 = 4.46$ |
| $r_7 = -13.41$ | $d_7 = 1.00$ | | $E_7 = 4.50$ |
| $r_8 = \infty$ (Stop) | $d_8 = 7.83$ | | $E_8 = 4.17$ |
| $r_9 = -30.00$ (Aspheric Surface) | $d_9 = 1.90$ | $n_{d5} = 1.59$  $\nu_{d5} = 29.90$ | $E_9 = 5.00$ |
| $r_{10} = -15.00$ | $d_{10} = 6.00$ | | $E_{10} = 5.21$ |
| $r_{11} = -10.24$ | $d_{11} = 1.40$ | $n_{d6} = 1.72$  $\nu_{d6} = 47.94$ | $E_{11} = 5.38$ |
| $r_{12} = -30.00$ | $d_{12} = 25.00$ | | $E_{12} = 5.50$ |
| $r_{13} = \infty$ (Imaging Plane) | | | |

| Aspheric Coefficient |
|---|
| 4th Surface |
| $A_4 = 1.12 \times 10^{-4}$ |
| $A_6 = 4.88 \times 10^{-7}$ |
| $A_8 = 1.60 \times 10^{-8}$ |
| 9th Surface |
| $A_4 = 3.86 \times 10^{-5}$ |
| $A_6 = 5.37 \times 10^{-7}$ |
| $A_8 = -8.32 \times 10^{-11}$ |

TABLE 11

| f (mm) | fF (mm) | fB (mm) | SF (mm) | SB (mm) | Refractive Index n | Wavelength $\lambda$ (nm) |
|---|---|---|---|---|---|---|
| −49.34 | 69.21 | −46.16 | 1.00 | 25.00 | 1.00 | 380.00 |

INDUSTRIAL APPLICABILITY

According to the invention as described above, it is possible to obtain an imaging apparatus wherein, even when there is a periodic streak produced on a molded optical element, images of good enough image quality can be obtained without being affected by the diffraction phenomenon yet without recourse to any polishing.

I claim:

1. An imaging apparatus in which a subject image is formed by an imaging optical system on an imaging plane wherein a plurality of pixels are two-dimensionally arranged, and a light receptor element for photoelectric transformation at each pixel is positioned, characterized in that:

said imaging optical system comprises a molded optical element fabricated through a fabrication process in which a periodic streak is produced on an optical surface, wherein:

when high-brightness subject light whose brightness value exceeds the saturation sensitivity of said light receptor element enters said imaging optical system, a nonessential light image resulting from said streak on said optical surface based on said high-brightness subject light is formed on said imaging plane and in an area of a subject image from said high-brightness subject light at the time when said optical plane is supposed to be free of said streak.

2. The imaging apparatus according to claim 1, characterized in that, based on at least one of optical parameters for determining the collecting/diverging performance of an optical system included between the optical surface having said streak and said imaging plane or the period of said streak, said nonessential light image is formed in the area of the subject image from said high-brightness subject light at the time when said optical surface is supposed to be free of said streak.

3. The imaging apparatus according to claim 1 or 2, characterized in that said nonessential light image is formed in such a way at to satisfy the following relation: P>Δt where Δt is a distance between a light intensity peak position of the subject image and a light intensity peak position of the nonessential light image, and P is a distance between the light intensity peak position of the subject image and a boundary of an area where the intensity of the subject image exceeds a saturation sensitivity of the light receptor element.

4. The imaging apparatus according to claim 1 or 2, characterized in that said nonessential light image is formed in such a way as to satisfy the following relation: I1>I2 where I1 is a light intensity of said subject image at the light intensity peak position of said nonessential light image, and I2 is a light intensity of said non-essential light image.

5. The imaging apparatus according to claim 1 or 2, characterized in that said nonessential light image has performance determined for the longest wavelength arriving at said imaging plane via said imaging optical system.

6. The imaging apparatus according to claim 1 or 2, characterized by satisfying the following relation (1):

$$Q > \{f + (SB - fB)(SF - fF)/f\} \times \sin^{-1}(\lambda/nd) \quad (1)$$

where λ is the longest wavelength arriving at the imaging plane via the imaging optical system, Q is a maximum radius of the area of said subject image, n is a refractive index on an image plane side of the optical surface having said streak, d is a period of the periodic streak on the streaked optical surface, f is a focal length of the optical system included between the streaked optical surface and the imaging plane, fF is a front focus position, fB is a back focus position, SF is a spacing between the streaked optical surface and the next optical surface on the imaging plane side, and SB is a spacing between a final surface of the optical system included between the streaked optical surface and the imaging plane and the imaging plane.

7. An imaging apparatus in which a subject image is formed by an imaging optical system on an imaging plane wherein a plurality of pixels are two-dimensionally arranged, and a light receptor element for photoelectric transformation at each pixel is positioned, characterized in that:

said imaging optical system comprises a molded optical element fabricated through a fabrication process in which a periodic streak is produced on an optical surface, wherein:

a nonessential light image from said streak on said optical surface based on high-brightness subject light whose brightness value exceeds a saturation sensitivity of said light receptor element is formed on said imaging plane and in a second imaging area different from a first imaging area where imaging information about the subject image is let in.

8. The imaging apparatus according to claim 7, characterized in that, based on at least one of optical parameters for determining the collecting/diverging performance of an optical system included between the optical surface having said streak and said imaging plane or a period of said streak, said nonessential light image is formed in the second imaging area.

9. The imaging apparatus according to claim 7 or 8, characterized in that said nonessential light image resulting from incident light rays at a maximum angle of incidence on the optical surface having said streak is formed at a position that does not go beyond an optical axis within said second imaging area.

10. The imaging apparatus according to claim 9, characterized in that as the light rays incident at the maximum angle of incidence on the optical surface having said streak, said nonessential light image has performance determined with respect to light rays exceeding the maximum angle of incidence according to design specifications.

11. The imaging apparatus according to claim 7 or 8, characterized in that said nonessential light image has performance determined for the shortest wavelength arriving at said imaging plane via said imaging optical system.

12. The imaging apparatus according to claim 7 or 8, characterized by satisfying the following relation (2):

$$H\{f+(SB-fB)(SF-fF)/f\}\times \sin^{-1}(\lambda/nd) \quad (2)$$

where $\lambda$ is the shortest wavelength arriving at said imaging plane via said imaging optical system, H is a maximum length of said first imaging area, n is a refractive index on an image plane side of the optical surface having said streak, d is a period of the periodic streak on the optical surface having said steak, f is a focal length of the optical system included between the optical surface having said streak and said imaging plane, fF is a front focus position, fB is a back focus position, SF is a spacing between the optical surface having said streak and the next optical surface on the imaging plane side, and SB is a spacing between a final surface of the optical system included between the optical surface having said streak and said imaging plane and said imaging plane.

* * * * *